United States Patent
Imai et al.

(10) Patent No.: US 10,025,141 B2
(45) Date of Patent: Jul. 17, 2018

(54) DISPLAY COMPONENT AND DISPLAY DEVICE

(71) Applicant: Sharp Kabushiki Kaisha, Osaka-shi, Osaka (JP)

(72) Inventors: Akihiro Imai, Osaka (JP); Makoto Kanbe, Osaka (JP); Motoaki Fukayama, Osaka (JP); Ryoh Ueda, Osaka (JP); Shigeki Tanaka, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 69 days.

(21) Appl. No.: 14/914,052

(22) PCT Filed: Jul. 17, 2014

(86) PCT No.: PCT/JP2014/069017
§ 371 (c)(1),
(2) Date: Feb. 24, 2016

(87) PCT Pub. No.: WO2015/045581
PCT Pub. Date: Apr. 2, 2015

(65) Prior Publication Data
US 2016/0209686 A1    Jul. 21, 2016

(30) Foreign Application Priority Data

Sep. 26, 2013    (JP) .................. 2013-200059

(51) Int. Cl.
*G02F 1/1337*    (2006.01)
*G02F 1/1333*    (2006.01)
*G02F 1/1339*    (2006.01)

(52) U.S. Cl.
CPC .......... *G02F 1/1337* (2013.01); *G02F 1/1339* (2013.01); *G02F 1/133345* (2013.01);
(Continued)

(58) Field of Classification Search
CPC ............ G02F 1/1337; G02F 1/133345; G02F 1/1339; G02F 1/133711; G02F 2001/133388
(Continued)

(56) References Cited

U.S. PATENT DOCUMENTS

2008/0129946 A1*    6/2008    Chan .................. G02F 1/1339
                                                                  349/153
2008/0137022 A1*    6/2008    Komeno ............... G02F 1/1337
                                                                  349/153
(Continued)

FOREIGN PATENT DOCUMENTS

CN    102854669 A    1/2013
JP    2006-259241 A    9/2006
(Continued)

OTHER PUBLICATIONS

Official Communication issued in International Patent Application No. PCT/JP2014/069017, dated Sep. 22, 2014.

*Primary Examiner* — Charles Chang
(74) *Attorney, Agent, or Firm* — Keating & Bennett, LLP

(57) ABSTRACT

An array board includes a glass substrate including a display area and a non-display area, an organic insulation film disposed over a range of the display area and the non-display area, an array board side alignment film disposed on the organic insulation film, a film forming area restricting portion disposed in the non-display area and recessed in a part of the surface of the organic insulation film, and an alignment film material storing portion disposed closer to the display area than the film forming area restricting portion in the non-display area and recessed in a part of the organic insulation film. An angle formed by at least a part of a surface of the alignment film material storing portion and a normal line of the glass substrate is greater than an angle formed by a side surface of the film forming area restricting portion and the normal line.

18 Claims, 26 Drawing Sheets

(52) U.S. Cl.
CPC ............... *G02F 1/133711* (2013.01); *G02F 2001/133388* (2013.01)

(58) Field of Classification Search
USPC .............................. 349/123–127, 149–152
See application file for complete search history.

(56) References Cited

U.S. PATENT DOCUMENTS

| | | |
|---|---|---|
| 2009/0289882 A1 | 11/2009 | Masui |
| 2011/0007233 A1 | 1/2011 | Matsui et al. |
| 2012/0300163 A1 | 11/2012 | Moriwaki et al. |
| 2013/0077035 A1 | 3/2013 | Kanzaki et al. |
| 2013/0194524 A1 | 8/2013 | Kita et al. |
| 2013/0215353 A1 | 8/2013 | Matsui et al. |
| 2015/0168755 A1 | 6/2015 | Matsui et al. |
| 2015/0192808 A1* | 7/2015 | Zhang ................. G02F 1/1337 349/43 |
| 2015/0192816 A1 | 7/2015 | Shih et al. |

FOREIGN PATENT DOCUMENTS

| | | |
|---|---|---|
| JP | 2009-282362 A | 12/2009 |
| JP | 2011-017834 A | 1/2011 |
| WO | 2011/086624 A1 | 7/2011 |
| WO | 2011/155133 A1 | 12/2011 |
| WO | 2012/046725 A1 | 4/2012 |

\* cited by examiner

FIG.13
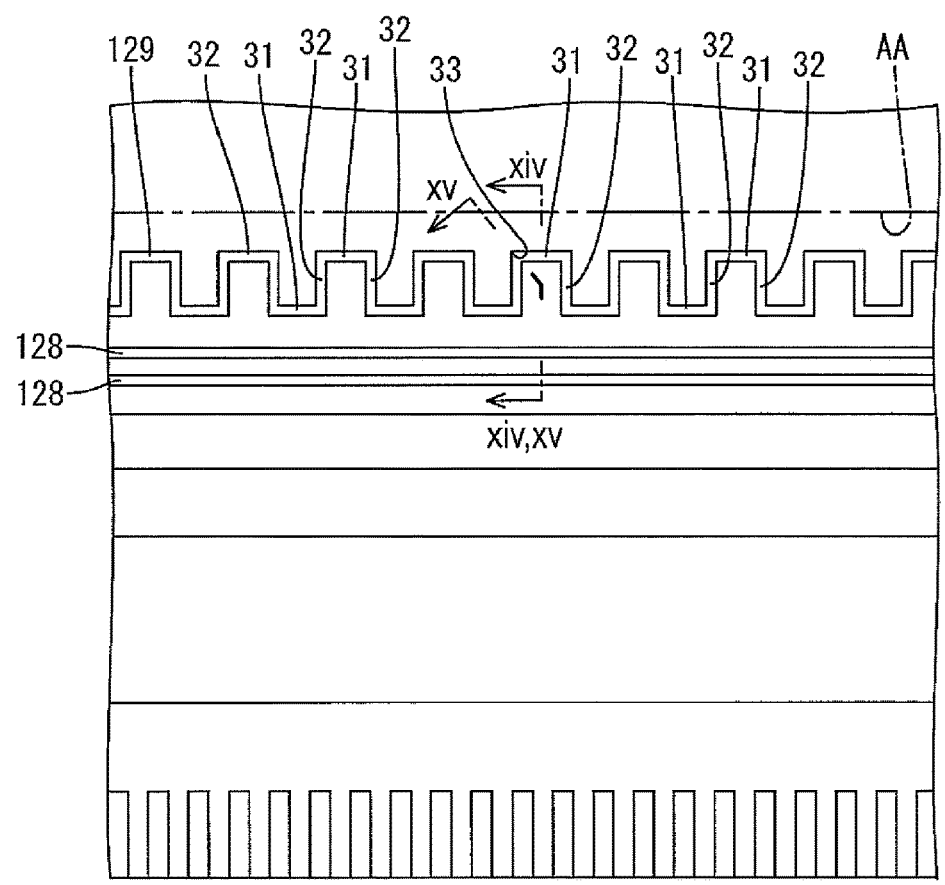
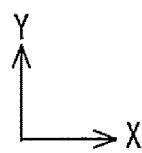

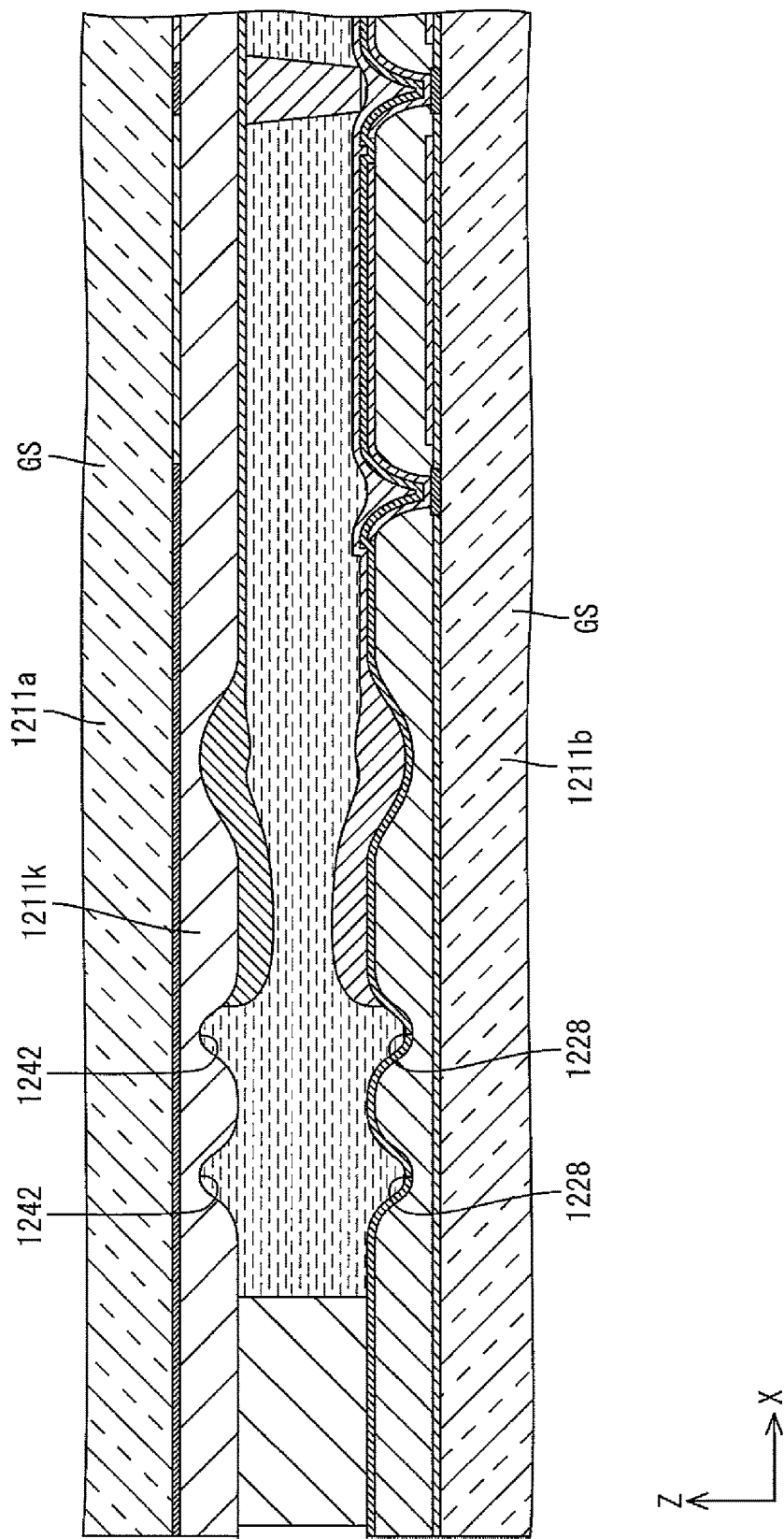

DISPLAY COMPONENT AND DISPLAY DEVICE

TECHNICAL FIELD

The present invention relates to a display component and a display device.

BACKGROUND ART

A liquid crystal panel, which is a major component of a liquid crystal display device, is configured as follows. The liquid crystal panel includes at least a pair of glass substrates, liquid crystals sandwiched between the substrates, and alignment films provided on inner plate surfaces of the respective substrates to align the liquid crystals. Such a liquid crystal panel described in Patent Document 1 has been known.

RELATED ART DOCUMENT

Patent Document

Patent Document 1: International Publication No. 2011/155133

Problem to be Solved by the Invention

In the patent document 1, the first substrate includes a wiring layer formed on a support substrate, an insulating film covering the wiring layer on the support substrate, and an alignment film that is formed by curing an alignment film material having fluidity. A recess portion is formed on a surface of the insulating film so as not to be through the insulating film, and an edge portion of the alignment film is supported by a bank of the recess portion and a bottom of the recess portion is uncovered by the alignment film. According to such a configuration, a non-display area is greatly reduced and the alignment film material is less likely to spread.

The alignment film material spreading on the surface of the insulating film is supported by the bank of the recess portion and less likely to spread over the bank of the recess portion. The alignment film material that does not spread over the bank of the recess portion will be returned to the display area side. Therefore, the alignment film may locally include a thick portion ranging from the support position supported by the bank of the recess portion. If the alignment film includes the thick portion within the display area, unevenness may occur in the thickness of the alignment film in the display area and images displayed on the liquid crystal panel may have degraded display quality. Especially, in the liquid crystal display device including a small-sized frame area, the alignment film is likely to include the thick portion in the display area.

DISCLOSURE OF THE PRESENT INVENTION

The technology disclosed herein was made in view of the above circumstances. An object is to provide a uniform film thickness of an alignment film.

Means for Solving the Problem

A display component according to the present invention includes a substrate including a display area and a non-display area surrounding the display area, an insulation film disposed on the substrate over a range of the display area and the non-display area, an alignment film disposed on a surface of the insulation film over a range of the display area and the non-display area, a film forming area restricting portion disposed in the non-display area and recessed in a part of the surface of the insulation film and having a side surface, and an alignment film material storing portion disposed closer to the display area than the film forming area restricting portion in the non-display area and recessed in a part of the insulation film and having a side surface. An angle formed by at least a part of the surface of the alignment film material storing portion and a normal line of a plate surface of the substrate is greater than an angle formed by the side surface of the film forming area restricting portion and the normal line.

In forming the alignment film, a material for the alignment film that is in a liquid state is applied on the display area of the substrate. The material flows and spreads on a surface of the insulation film disposed on the substrate to form the alignment film. The alignment film overlaps the surface of the insulation film. The alignment film is disposed over a range of the display area and the non-display area and surely formed in the display area.

The surface of the insulation film is partially recessed so that the film forming area restricting portion is formed in the non-display area. According to this configuration, in forming the alignment film, the material for the alignment film spreads over the surface of the insulation film from the display area side toward the non-display area, and the film forming area restricting portion prevents the material from spreading further outwardly from the film forming area restricting portion. Accordingly, the area where the alignment film is formed is defined (restricted). In forming the alignment film, the material for the alignment film spreading over the surface of the insulation film reaches the film forming area restricting portion and the material is held by the side surface of the film forming area restricting portion so as not to spread further from the holding portion. The material that does not spread is returned from the holding portion toward the display area. Therefore, the alignment film locally includes the thick portion ranging from the holding portion held by the side surface. If the alignment film includes the thick portion not only in the non-display area but also in the display area, unevenness may be caused in the thickness of the alignment film in the display area. Particularly, if the width of the non-display area is reduced or the frame size is reduced, the thick portion is likely to be disposed in the display area.

The alignment film material storing portion is disposed closer to the display area than the film forming area restricting portion in the non-display area by recessing a part of the insulation film. At least a part of the side surface of the alignment film material storing portion and the normal line of the plate surface of the substrate form an angle that is greater than an angle formed by the side surface of the film forming area restricting portion and the normal line. According to such a configuration, the spread of the material for the alignment film is less likely to be restricted due to the part of the side surface of the alignment film material storing portion and therefore, the material is stored in the alignment film material storing portion. The material for the alignment film is held by the side surface of the film forming area restricting portion and returned toward the display area. Accordingly, the thick portion is generated in the alignment film. However, the area where the thick portion is formed is decreased by the amount of the material for the alignment film stored in the alignment film material storing portion.

Thus, the thick portion is less likely to be formed in the display area and the thickness of the alignment film is uniform in the display area. Therefore, display quality of display using the display component is improved and it is particularly preferable to decrease the frame size.

The Preferable embodiments of a first display component according to the present invention may include the following configurations.

(1) The alignment film material storing portion may have a width greater than that of the film forming area restricting portion. According to such a configuration, the alignment film material storing portion can store a great amount of the material for the alignment film. Therefore, the thickness of the alignment film is preferably uniform in the display area. Further, the depth dimension of the alignment film material storing portion may be increased than that of the film forming area restricting portion to increase a capacity within the alignment film material storing portion. The alignment film material storing portion having the increased depth dimension is easily formed in the insulation film with patterning by the photolithography method compared to a case that the insulation film is exposed with using a photomask. If the organic insulation film is exposed with using a photomask to form the alignment film material storing portion, it is difficult to control a light exposure amount.

(2) The insulation film may have a multilayered structure including an inorganic insulation film having a relatively small thickness and an organic insulation film having a relatively great thickness, and the alignment film material storing portion may be recessed at least in the organic insulation film. The alignment film material storing portion is formed by recessing at least the insulation film having a relatively great thickness. Therefore, it is easy to increase the depth or the capacity of the alignment film material storing portion and the greater amount of the material for the alignment film is stored in the alignment film material storing portion. Accordingly, the thickness of the alignment film is effectively uniform in the display area.

(3) The alignment film material storing portion may be disposed to surround an entire periphery of the display area. According to such a configuration, a uniform thickness of the alignment film is achieved over the entire periphery of the display area.

(4) A minimum value of the angle formed by the at least a part of the side surface of the alignment film material storing portion and the normal line may be greater than an angle formed by a portion of the side surface of the film forming area restricting portion holding a material for the alignment film and the normal line. According to such a configuration, the material for the alignment film is held by at least a portion of the side surface of the alignment film material storing portion and the spread of the material for the alignment film is less likely to be restricted by the holding of the material and therefore, the material is surely stored in the alignment film material storing portion.

(5) The minimum value of the angle formed by the at least a part of the side surface of the alignment film material storing portion and the normal line may be from 60 degrees to 80 degrees. If the minimum value of the angle is greater than 80 degrees, the area where the alignment film material storing portion is formed on the plate surface of the substrate is necessary to be increased to keep the effective capacity of the alignment film material storing portion. Therefore, the width of the non-display area is hardly reduced and the size reduction of the frame is less likely to be achieved. On the other hand, if the minimum value of the angle is smaller than 60 degrees, the material for the alignment film 11e is likely to be held by the side surface of the alignment film material storing portion in forming the alignment film. Therefore, the material may be less likely to be stored in the alignment film material storing portion. With the configuration that the alignment film material storing portion is formed to have the angle within the range from 60 degrees to 80 degrees, it is preferable to reduce the frame size and the material for the alignment film is surely stored in the alignment film material storing portion.

(6) The minimum value of the angle formed by the at least a part of the side surface of the alignment film material storing portion and the normal line may be from 70 degrees to 80 degrees. With the configuration that a lowest value of the angle within the above range is 70 degrees, the material for the alignment film is further surely stored in the alignment film material storing portion.

(7) A minimum value of the angle formed by the side surface of the film forming area restricting portion and the normal line may be smaller than a minimum value of the angle formed by the at least a part of the side surface of the alignment film material storing portion and the normal line. According to such a configuration, the material for the alignment film is more surely held by the side surface of the film forming area restricting portion and the area where the alignment film is formed is surely restricted.

(8) The minimum value of the angle formed by the side surface of the film forming area restricting portion and the normal line may be 50 degrees or smaller. If the angle is greater than 50 degrees, the material for the alignment film is less likely to be held by the side surface of the film forming area restricting portion in forming the alignment film, and the spread of the material may not be restricted. On the other hand, as the angle formed by the side surface of the film forming area restricting portion and the normal line is smaller, the material for the alignment film is likely to be held by the side surface of the film forming area restricting portion. Therefore, with the configuration that the film forming area restricting portion is formed to have the angle of 50 degrees or less, the area where the alignment film 11e is formed is surely restricted.

(9) A minimum value of the angle formed by an entire area of the side surface of the alignment film material storing portion and the normal line may be greater than an angle formed by a portion of the side surface of the film forming area restricting portion holding a material for the alignment film and the normal line. According to such a configuration, the material for the alignment film is less likely to be held by the entire area of the side surface of the alignment film material storing portion in forming the alignment film. Therefore, the material is smoothly stored in the alignment film material storing portion. Thus, the thickness of the alignment film is made uniform in the display area more preferably.

(10) The alignment film material storing portion may have a plan view shape including a corner portion, and the plan view shape being seen in a direction along the normal line. A minimum value of an angle formed by a side surface of the corner portion and the normal line may be greater than an angle formed by a portion of the side surface of the film forming area restricting portion holding a material for the alignment film and the normal line. According to such a configuration, in forming the alignment film, the material for the alignment film is less likely to be held by the side surface of the corner portions of the alignment film material storing portion and the material is stored in the alignment film material storing portion. Accordingly, the angle formed by the normal line and the side surface of the portions of the alignment film material storing portion excluding the corner portions may be substantially same as the angle formed by the side surface of the film forming area restricting portion and the normal line. Even with the above configuration, the material for the alignment film is stored in the alignment film material storing portion. The alignment film material storing portion including the corner portions may be formed in the insulation film by the photolithography method with patterning. With such a method, the amount of exposure light exposed to the insulation film is same in a portion of the insulation film where the alignment film material storing portion is to be formed and a portion thereof where the film forming area restricting portion is to be formed. Accordingly, the alignment film material storing portion and the film forming area restricting portion are easily formed.

(11) A second display component according to the present invention includes a substrate including a display area and a non-display area surrounding the display area, an insulation film disposed on the substrate over a range of the display area and the non-display area, an alignment film disposed on a surface of the insulation film over a range of the display area and the non-display area, a film forming area restricting portion disposed in the non-display area and projecting from the surface of the insulation film, and an alignment film material storing portion disposed closer to the display area than the film forming area restricting portion in the non-display area and recessed in apart of the insulation film.

In forming the alignment film a material that is in a liquid state and used for the alignment film is supplied to the display area of the substrate. The material flows and spreads over the surface of the insulation film disposed on the substrate so that the alignment film is formed over the surface of the insulation film. The alignment film is disposed over a range of the display area and the non-display area so that the alignment film is surely disposed over the display area.

The film forming area restricting portion projects from the surface of the insulation film and disposed in the non-display area. The material for the alignment film flows and spreads from the display area toward the non-display area in forming the alignment film. The film forming area restricting portion stops the flow of the material for the alignment film and the material is less likely to spread outwardly from the film forming area restricting portion. Accordingly, the area where the alignment film is formed is restricted. The material for the alignment film spreads over the surface of the insulation film in forming the film, and the film forming area restricting portion, which projects from the surface of the insulation film, stops the spread of the material further from the film forming area restricting portion. The material stopped by the film forming area restricting portion is returned toward the display area side and the thick portion is generated in the alignment film. The thick portion ranges from the film forming area restricting portion. If the alignment film includes the thick portion in the display area, the thickness of the alignment film is uneven in the display area. If the width of the non-display area is decreased to reduce the frame size, the thick portion is likely to be disposed in the display area.

The alignment film material storing portion is formed by partially recessing the insulation film and is closer to the display area than the film forming area restricting portion in the non-display area. Accordingly, the material for the alignment film is stored in the alignment film material storing portion. If the material for the alignment film is stopped by the film forming area restricting portion and returned toward the display area and the thick portion may be generated in the alignment film, the area where the thick portion is generated is reduced by the amount of the material for the alignment film stored in the alignment film material storing portion. Therefore, the thick portion is less likely to be in the display area. Thus, the thickness of the alignment film is uniform in the display area and therefore, the display quality of display with the display component is improved. Particularly, it is effective to reduce the frame size.

A display device according to the present invention includes the first display component or the second component, an opposed display component attached to the first display component or the second display component with a distance therebetween to be opposed to the first or the second display component, liquid crystals sandwiched between the first display component or the second display component and the opposed display component, and a sealing member surrounding the liquid crystals and disposed between the first display component or the second display component and the opposed display component to enclose the liquid crystals. The film forming area restricting portion is disposed closer to the display area than the sealing member and surrounds an entire periphery of the display area.

According to such a display device, the material for the alignment film is stored in the alignment film material storing portion included in the first or second display component so that the thick portion to be formed in the alignment film is less likely to be formed in the display area. Therefore, the thickness of the alignment film is uniform and the display quality of the display device is improved. The film forming area restricting portion is disposed closer to the display area than the sealing member and to surround the entire periphery of the display area and the film forming area restricting portion restricts the area where the alignment film is formed. Therefore, the alignment film is less likely to be disposed to overlap the sealing member. Accordingly, the sealing properties of the sealing member are less likely to be adversely affected and moisture is less likely to enter the liquid crystals from outside.

The Preferable embodiments of the display device according to the present invention may include the following configurations.

(1) The display device may further include a display element disposed on the first or second display component or the opposed display component to face the liquid crystals, and a semiconductor film included in the display element and formed of oxide semiconductor. According to such a configuration, images are displayed in the display area with the display element. The oxide semiconductors of the semiconductor film included in the display element is likely to change its mechanical properties if exposed to moisture or water. However, as described before, the alignment film is less likely to overlap the sealing member so that moisture is less likely to enter the liquid crystals from outside. Therefore, the electrical properties of the oxide semiconductors are less likely to change and the properties of the display element are less likely to be deteriorated.

(2) The oxide semiconductor may include indium (In), gallium (Ga), zinc (Zn), and oxide (O). Accordingly, the oxide semiconductors containing indium (In), gallium (Ga), zinc (Zn), and oxide (O) are less likely to change its electrical properties and the properties of the display element are less likely to be deteriorated.

(3) The oxide semiconductor may include crystalline qualities. According to such a configuration, the oxide semiconductors containing indium (In), gallium (Ga), zinc (Zn), and oxide (O) and having crystalline qualities are less likely to change its electric properties. Therefore, properties of the display element are less likely to be deteriorated.

Advantageous Effect of the Invention

According to the present technology, a film thickness of an alignment film can be uniform.

BRIEF DESCRIPTION OF THE DRAWINGS

FIG. 13 is a plan view illustrating a part of an array board according to a second embodiment of the present invention.

FIG. 26 is a cross-sectional view illustrating a cross-sectional configuration of an edge portion of a liquid crystal panel according to a thirteenth embodiment of the present invention.

MODE FOR CARRYING OUT THE INVENTION

First Embodiment

Figure 1:
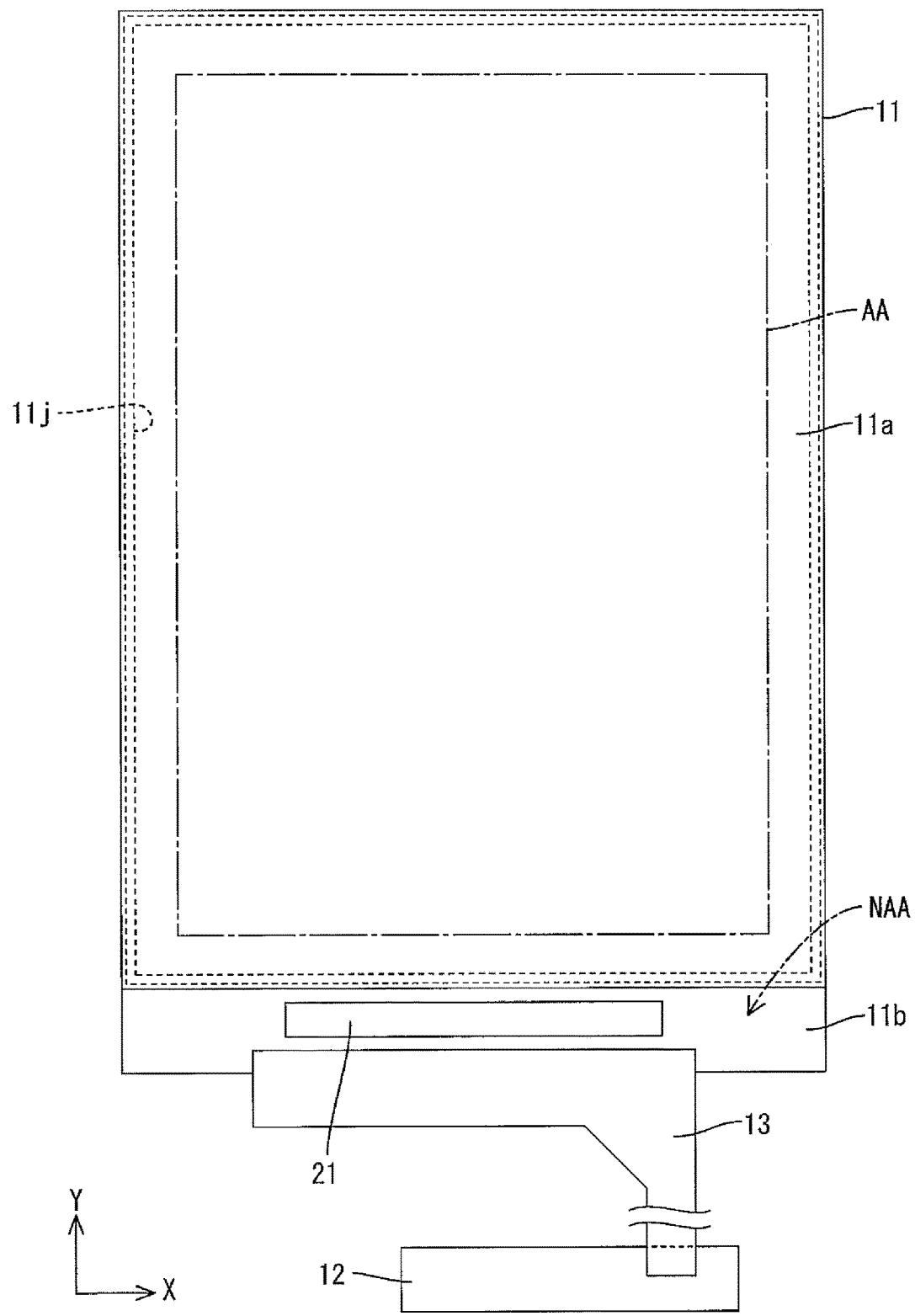
FIG. 1 is a plan view illustrating a connection configuration of a liquid crystal panel having a driver thereon, a flexible board, and a control circuit board according to a first embodiment.

A first embodiment of the present invention will be described with reference to FIGS. 1 to 12. A liquid crystal display device 10 will be described in this description. X-axis, Y-axis and Z-axis may be indicated in the drawings. The axes in each drawing correspond to the respective axes in other drawings. The upper side and the lower side in FIGS. 2 and 4 correspond to the front side and the rear side, respectively.

Figure 2:
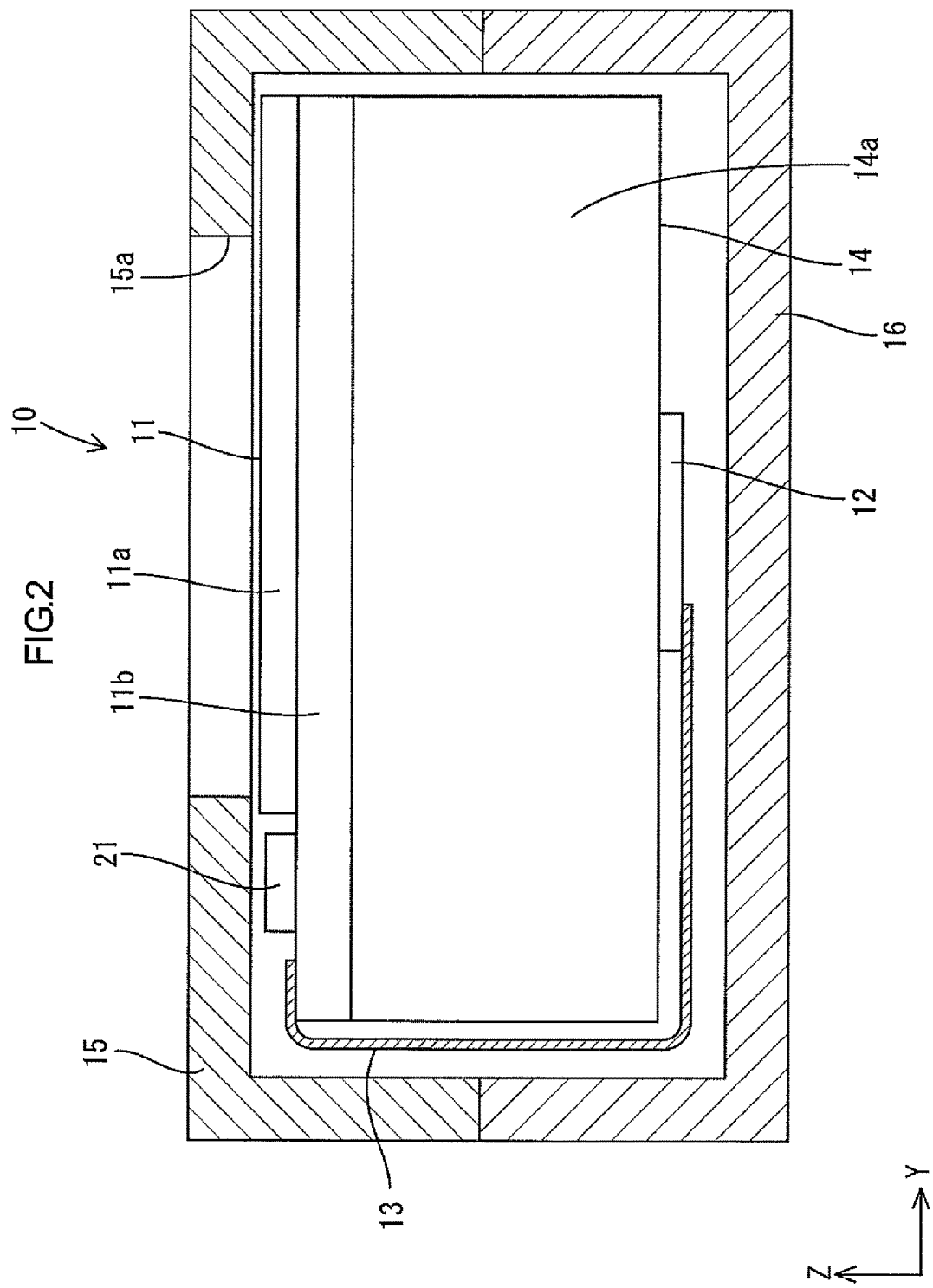
FIG. 2 is a cross-sectional view of the liquid crystal display device cut along a long-side dimension thereof.

As illustrated in FIGS. 1 and 2, the liquid crystal display device 10 includes a liquid crystal panel (a display device, a display panel) 11, a driver (a panel driving part) 21, a control circuit board (an external signal supplier) 12, a flexible board (an external connection component) 13, and a backlight device (a lighting device) 14. The liquid crystal panel 11 includes a display area (an active area) AA where images appear and that is in a middle area thereof and a non-display area (a non-active area) NAA that is on an outer peripheral side of the display area AA and surrounds the display area AA. The driver 21 is configured to drive the liquid crystal panel 11. The control circuit board 12 supplies input signals to the driver 21. The flexible board 13 electrically connects the liquid crystal panel 11 and the external control circuit board 12. The backlight device 14, which is an external light source, supplies light to the liquid crystal panel 11. The liquid crystal display device 10 includes a pair of front and exterior members 15, 16 that are mounted together to arrange and hold the liquid crystal panel 11 and the backlight device 14 therein. The front exterior member 15 has an opening 15a through which an image displayed in the display area AA of the liquid crystal panel 11 can be seen from outside. The liquid crystal display device 10 according to the present embodiment is used in electronic devices including mobile phones (including smart phones), notebook computers (including tablet type notebook computers), portable terminal devices (including electronic book and PDA), digital photo frames, portable video games, and electronic ink papers. The display size of the liquid crystal panel 11 included in the liquid crystal display device 10 is approximately from several inches to several dozen inches and is generally classified as a small sized panel or a medium sized panel.

The backlight device 14 will be simply described. As illustrated in FIG. 2, the backlight device 14 includes a chassis 14a, a light source (such as a cold cathode tube, an LED, and an organic EL), and an optical member (not illustrated). The chassis 14*a* has a substantially box shape that has an opening open toward a front side (a liquid crystal panel 11 side). The light source (not illustrated) is arranged in the chassis 14*a*. The optical member is arranged to cover the opening of the chassis 14*a* and configured to convert light emitted by the light source into a planer light.

Figure 7:
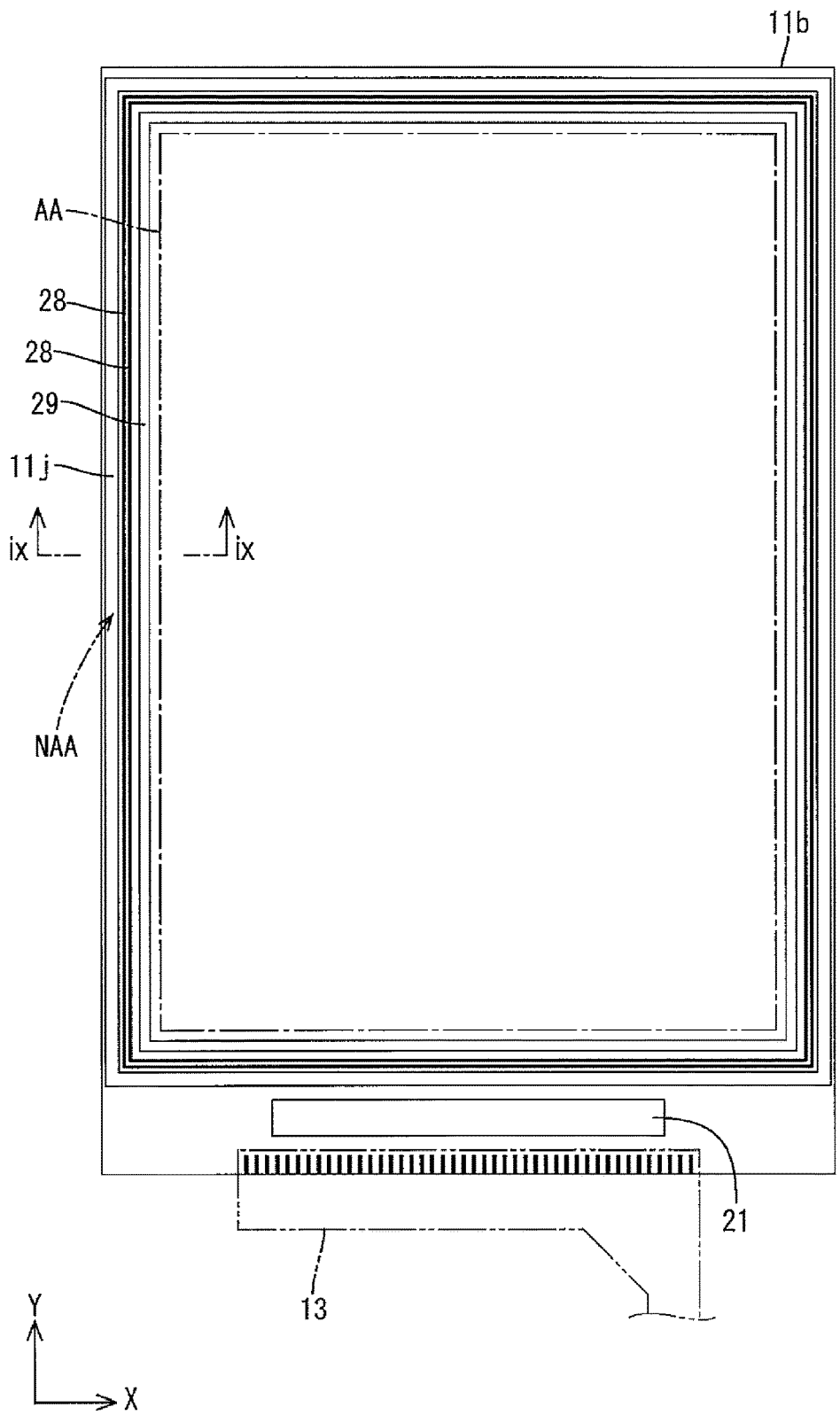
FIG. 7 is a plan view of the array board.

The liquid crystal panel 11 will be described. As illustrated in FIG. 1, the liquid crystal panel 11 has a vertical rectangular shape as a whole and includes the display area AA that is close to one of short-side edges (an upper side in FIG. 1) and further includes the driver 21 and the flexible board 13 close to another one of the short-side edges (a lower side in FIG. 1). An area of the liquid crystal panel 11 other than the display area AA corresponds to the non-display area NAA where images are not displayed. The non-display area NAA includes a substantially frame-shaped area that surrounds the display area AA (corresponds to a frame part of a CF board 11*a*, which will be described later) and an area near the other short-side edge (a portion of the array board 11*b* not overlapping the CF board 11*a* and uncovered by the CF board 11*a*). The area near the other short-side edge includes a mount area where the driver 21 and the flexible board 13 are mounted. The short-side direction of the liquid crystal panel 11 corresponds to the X-axis direction in the respective drawings and the long-side direction corresponds to the Y-axis direction in the respective drawings. In FIGS. 1 and 7, an outer shape of the display area AA is illustrated by alternate long and short dashed lines forming a frame shape that is slightly smaller than the CF board 11*a* and an area outside the alternate long and short dashed lines corresponds to the non-display area NAA.

Next, components connected to the liquid crystal panel 11 will be described. As illustrated in FIGS. 1 and 2, the control circuit board 12 is mounted on a rear surface of the chassis 14*a* (an outer surface opposite from the liquid crystal panel 11) included in the backlight device 14 with screws. The control circuit board 12 includes electric components for providing the driver 21 with various input signals. The electric components are mounted on a phenolic paper or glass epoxy resin substrate on which traces (electrically-conducting paths) are formed in predetermined patterns (not illustrated). The control circuit board 12 is electrically and mechanically connected to a first end of ends (one end) of the flexible board 13 via an anisotropic conductive film (ACF, not illustrated).

As illustrated in FIG. 2, the flexible circuit board (an FPC board) 13 includes a base member made of synthetic resin (e.g., polyimide resin) having insulating properties and flexibility. A number of traces are formed on the base member (not illustrated). The first end of the long dimension of the flexible circuit board 13 is connected to the control circuit board 12 disposed on the rear surface of the chassis 14*a* as described earlier. A second end (another end) is connected to the array board 11*b* of the liquid crystal panel 11. In the liquid crystal display device 10, the flexible circuit board 13 is folded in U-like shape in a cross-sectional view. At ends of the long dimension of the flexible circuit board 13, the traces are exposed to the outside to form terminal portions (not illustrated). The terminal portions are electrically connected to the control circuit board 12 and the array board 11*b*, respectively. With this configuration, the input signals are transmitted from the control circuit board 12 to the liquid crystal panel 11.

As illustrated in FIG. 1, the driver 21 is an LSI chip including a driver circuit therein. The driver 21 is configured to operate based on signals from the control circuit board 12, which is a signal source, to generate output signals from the input signals from the control circuit board 12, and to send the output signals to the display area AA of the liquid crystal panel 11. The driver 21 has a landscape rectangular shape in a plan view (a longitudinal shape along the short edge of the liquid crystal panel 11). The driver 21 is directly mounted on the array board 11*b* of the liquid crystal panel 11 in the non-display area NAA, that is, through a chip on glass (COG) mount method. The long-side direction of the driver 21 corresponds with the X-axis direction (the short-side direction of the liquid crystal panel 11) and the short-side direction thereof corresponds with the Y-axis direction (the long-side direction of the liquid crystal panel 11).

Figure 3:
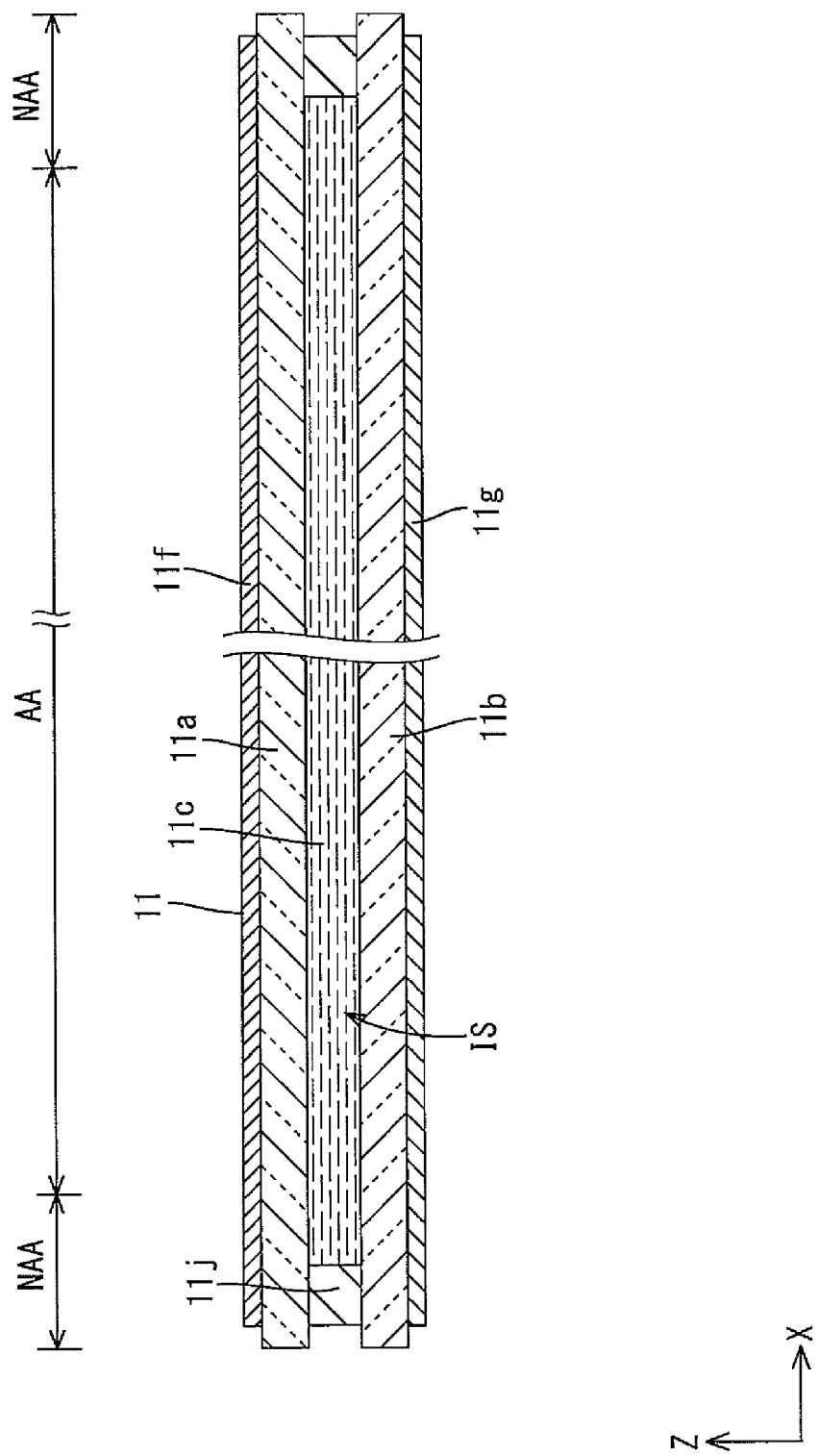
FIG. 3 is a cross-sectional view illustrating a cross-sectional configuration of the whole liquid crystal panel.

The liquid crystal panel 11 will be described. As illustrated in FIG. 3, the liquid crystal panel 11 at least includes a pair of substrates 11*a*, 11*b*, a liquid crystal layer (liquid crystals) 11*c*, and a sealing member 11*j*. The substrates 11*a*, 11*b* are opposite each other and has an inner space IS therebetween. The liquid crystal layer 11*c* is between the substrates 11*a*, 11*b*. The liquid crystal layer 11*c* contains liquid crystal molecules, which are substances that change optical characteristics when electromagnetic field is applied. The sealing member 11*j* is between the substrates 11*a*, 11*b* and surrounds and seals the inner space IS and the liquid crystal layer 11*c* arranged in the inner space IS. One of the substrates 11*a*, 11*b* on the front side is the CF board (an opposite display component) 11*a* and one on the rear side is the array board (a TFT board, an active matrix board, a display component) 11*b*. Polarizing plates 11*f*, 11*g* are attached to outer surfaces of the substrates 11*a*, 11*b*, respectively.

The liquid crystals included in the liquid crystal layer 11*c* are sealed between the substrates 11*a*, 11*b* by a dropping injection method. After the liquid crystal material of the liquid crystal layer 11*c* is dropped on the CF board 11*a*, the array board 11*b* is attached to the CF board 11*a*. Then, the liquid crystal material is spread evenly within the inner space IS between the substrates 11*a*, 11*b*. Thus, the liquid crystal layer 11*c* is formed. The sealing member 11*j* is arranged in the non-display area NAA of the liquid crystal panel 11 and has a substantially vertical rectangular frame shape following the shape of the non-display area NAA in a plan view (seen in a normal line direction with respect to plate surfaces of the substrates 11*a*, 11*b*) (see FIGS. 1 and 7). The sealing member 11*j* is formed on the CF board 11*a* of the pair of substrates 11*a*, 11*b* in the process of manufacturing the liquid crystal panel 11. The substrates 11*a*, 11*b* have a gap therebetween in the outer peripheral edge portions thereof and the gap (a thickness of the liquid crystal layer 11*c*), which is a cell gap, is maintained constant by the sealing member 11*j*. The cell gap is approximately from 3 µm to 3.6 µm. The sealing member 11*j* includes at least ultraviolet curing resin (curable resin) that is cured by irradiation of ultraviolet rays and spacer particles that are dispersed in the ultraviolet curing resin. The ultraviolet curing resin is in liquid state having fluidity before irradiation of ultraviolet rays and is cured by irradiation of ultraviolet rays and in a solid state. The spacer particles are made of synthetic resin and have a spherical shape. The spacer particles are dispersed in the ultraviolet curing resin at a certain density (for example, approximately 1 wt %) and have a diameter that is substantially equal to the cell gap of the liquid crystal panel 11. The sealing member 11*j* that is arranged in three-side edge portions (non-mount edge portions) of the liquid crystal panel 11 except for the side edge portion thereof where the driver 21 and the flexible board 13 are mounted is disposed in an outer most edge portion of the non-display area NAA (FIG. 1).

Figure 4:
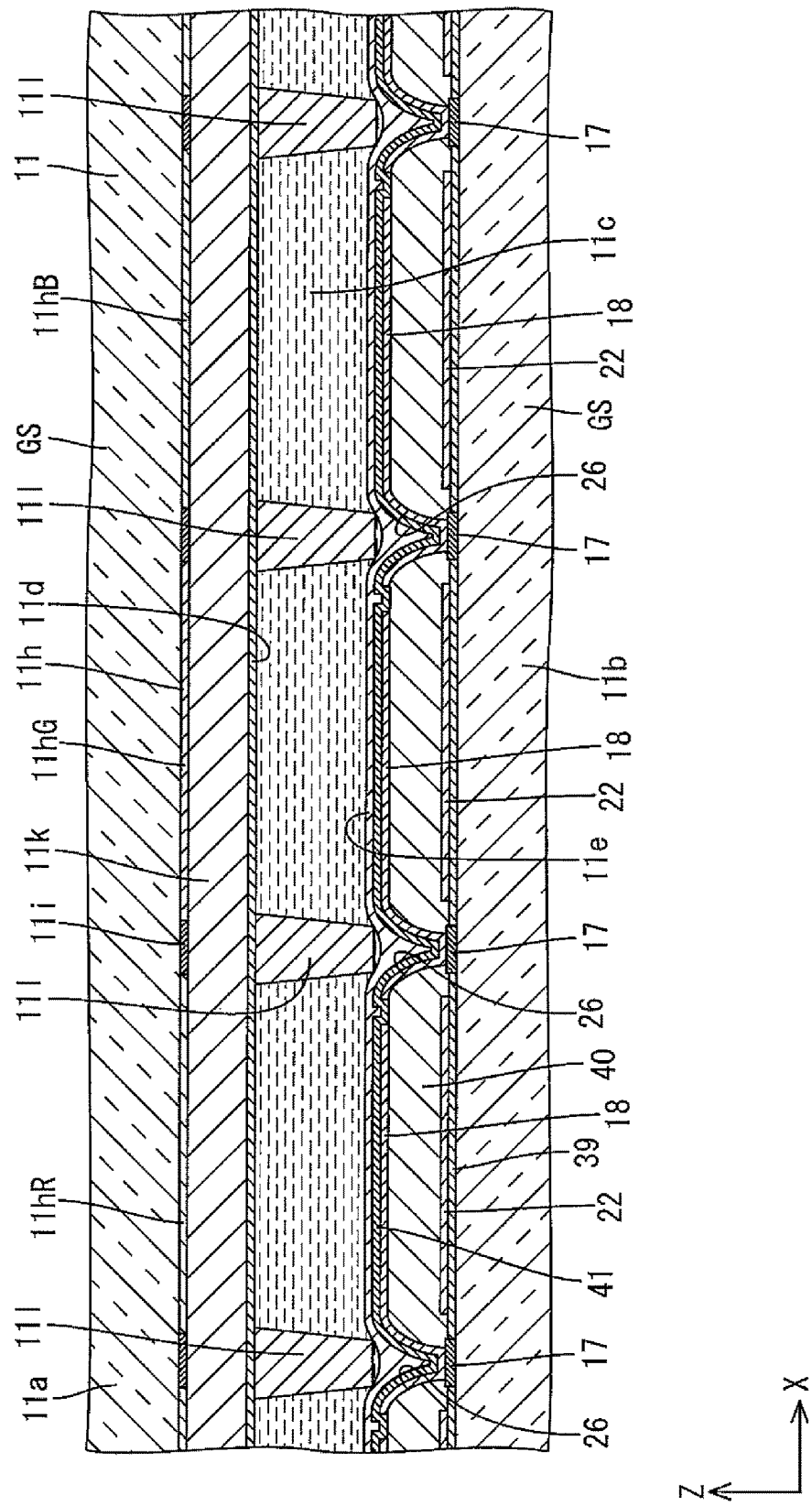
FIG. 4 is a cross-sectional view illustrating a cross-sectional configuration of the liquid crystal panel in a display area.

The liquid crystal panel 11 in this embodiment operates in fringe field switching (FFS) mode that is a mode improved from an in-plane switching (IPS) mode. As illustrated in FIG. 4, on one of the substrates 11a and 11b, specifically, on the array board 11b, pixel electrodes (second transparent electrodes) 18 and common electrodes (first transparent electrodes) 22, which will be described later, are formed. The pixel electrodes 18 and the common electrodes 22 are formed in different layers. The CF board 11a and the array board 11b include glass substrates GS that are substantially transparent (i.e., having high light transmissivity). Various films are formed in layers on each glass substrate GS. As illustrated in FIGS. 1 and 2, the CF board 11a has a short dimension substantially equal to that of the array board 11b and a long dimension smaller than that of the array board 11b. The CF board 11a is bonded to the array board 11b with one of ends of the long dimension (the upper end in FIG. 1) aligned with a corresponding edge of the array board 11b. A predetermined area of the other end of the long dimension of the array board 11b (the lower end in FIG. 1) does not overlap the CF board 11a and front and back plate surfaces in the area are exposed to the outside. The mounting area in which the driver 21 and the flexible printed circuit board 13 are mounted is provided in this area. In FIGS. 4 and 7, the films (structures) included in each substrate 11a, 11b are described schematically, and the size (thickness, height) and the arrangement of each structure does not necessarily correspond to the actual size and arrangement.

Figure 5:
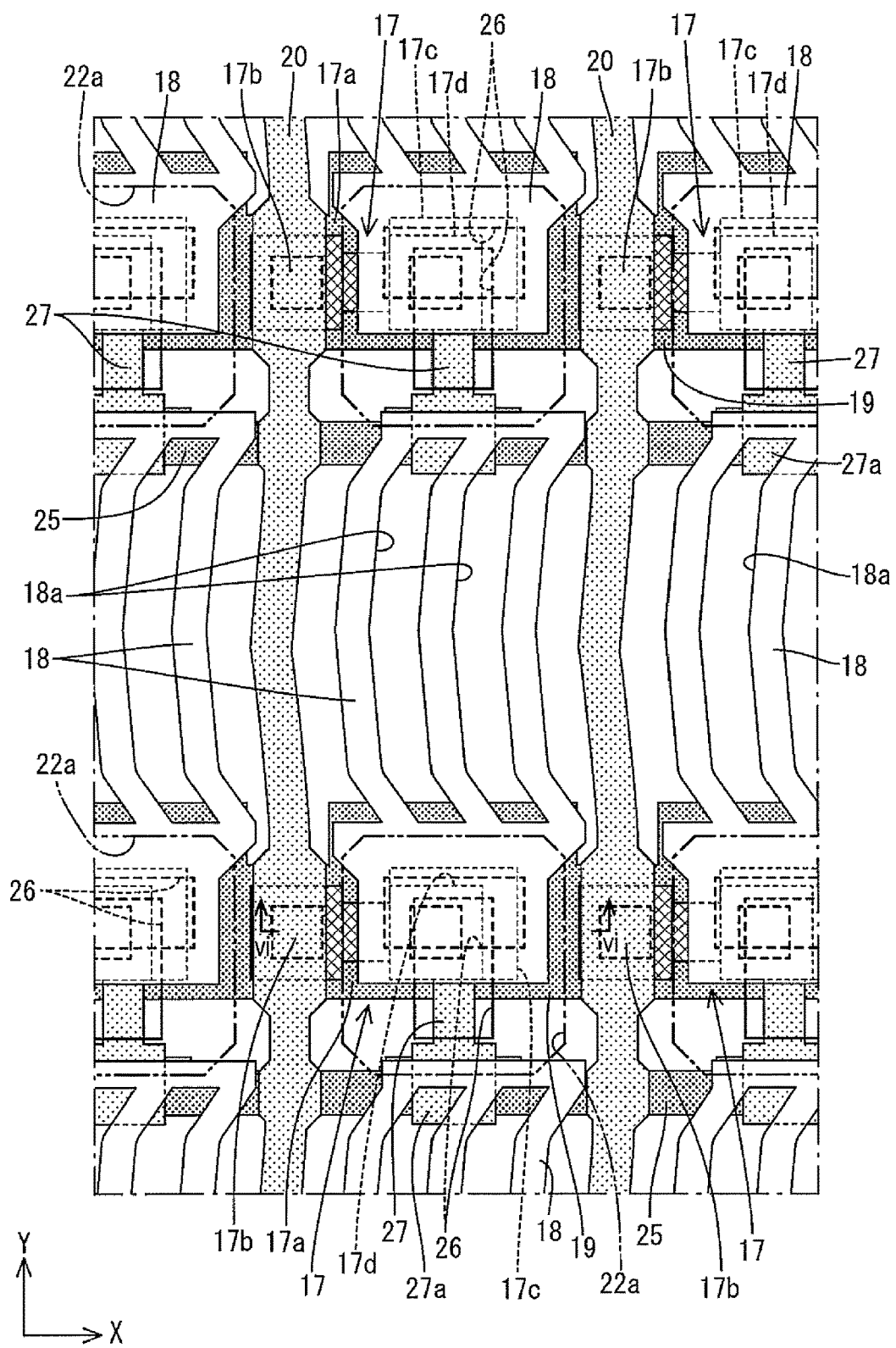
FIG. 5 is a plan view illustrating a planar configuration of an array board in the display area.
Figure 6:
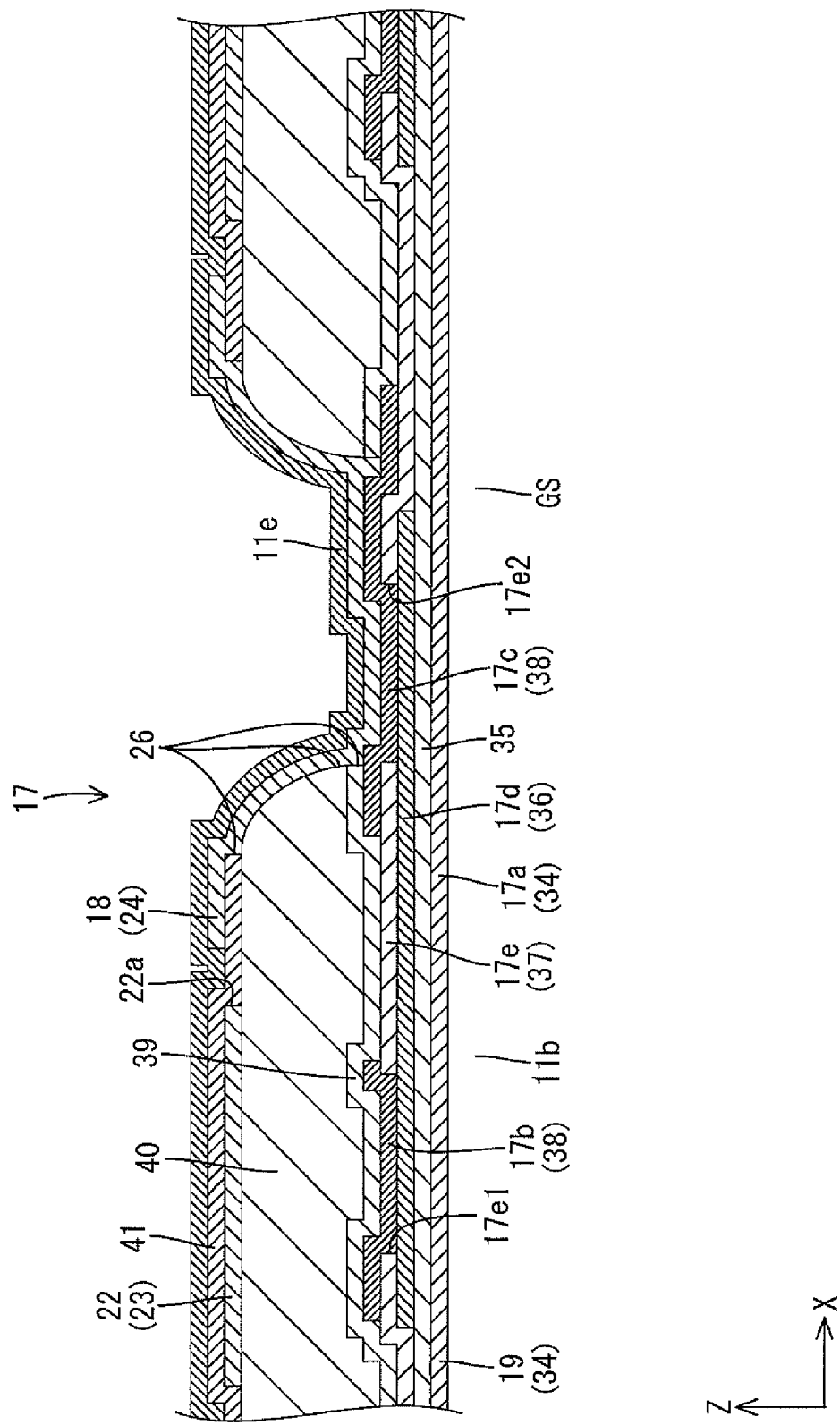
FIG. 6 is a cross-sectional view cut along line vi-vi in FIG. 5.

The films formed in layers on the inner surface of the array board 11b (on the liquid crystal layer 11c side, a surface opposite the CF board 11a) by a known photolithography method will be described. As illustrated in FIG. 6, on the array board 11b, the following films are formed in the following sequence from the lowest layer (the grass substrate GS): a first metal film (a gate metal film) 34, a gate insulator 35, a semiconductor film 36, a protection film (an etching stopper film, an insulation film, a inorganic insulation film) 37, a second metal film (a source metal film) 38, a first interlayer insulation film (an insulation film, inorganic insulation film) 39, an organic insulation film (an insulation film) 40, a first transparent electrode film 23, a second interlayer insulation film (an insulation film, an inorganic insulation film) 41, a second transparent electrode film 24, and an array board side alignment film (an alignment film) 11e. In FIG. 5, the first metal film 34, the semiconductor film 36, and the second metal film 38 are described with shaded.

The first metal film 34 is a multilayered film of titanium (Ti) and copper (Cu). The gate insulator 35 is layered at least on an upper surface of the first metal film 34 and contains silicon oxide ($SiO_2$). The semiconductor film 36 is an oxide thin film that is a kind of oxide semiconductors. An example of such oxide semiconductors may be In—Ga—Zn—O semiconductors containing indium (In), gallium (Ga), zinc (Zn), and oxide (O) as main components. The In—Ga—Zn—O semiconductors are ternary oxide of indium (In), gallium (Ga), and zinc (Zn), and the ratio (composition ratio) of In, Ga, and Zn is not particularly limited but may be In:Ga:Zn=2:2:1, In:Ga:Zn=1:1:1, or In:Ga:Zn=1:1:2. In this embodiment, the In—Ga—Zn—O semiconductors contains In, Ga, and Zn at a ratio of 1:1:1. The oxide semiconductors (In—Ga—Zn—O semiconductors) included in the semiconductor film 36 may be amorphous but may preferably be crystalline having crystalline qualities. The oxide semiconductors having the crystalline qualities may preferably be crystalline In—Ga—Zn—O semiconductors where c-axis is oriented substantially vertical to a layer surface. A crystal structure of the crystalline In—Ga—Zn—O semiconductors is described in Japanese Patent Unexamined Publication Application No. 2012-134475. For reference, the entire content of JPA 2012-134475 is hereby incorporated by reference.

The protection film 37 is an inorganic insulation film that contains silicone oxide (SiO2) as an inorganic material. The second metal film 38 is a layered film that contains titanium (Ti) and copper (Cu). The first interlayer insulation film 39 is an inorganic insulation film that contains silicone oxide (SiO2) that is an inorganic material. The organic insulation film 40 contains acrylic resin (e.g., polymethyl methacrylate (PMMA)), which is an organic material having photosensitivity. The organic insulation film 40 is formed with patterning by a known photolithography method in the process of manufacturing the array board 11b. The first transparent electrode film 23 and the second transparent electrode film 24 are made of transparent electrode material such as indium tin oxide (ITO) and zinc oxide (ZnO). The second interlayer insulation film 41 is an inorganic insulation film that contains silicon nitride (SiNx) as an inorganic material. The organic insulation film 40 among the insulation films 37, 39 to 40 has a film thickness that is greater than that of other inorganic insulation films 37, 39, 41 and is approximately 2 μm (20,000 Å) and the organic insulation film 40 functions as a flattening film. The inorganic insulation films 37, 39, 41 other than the organic insulation film 40 among the insulation films 37, 39 to 40 have a film thickness that is smaller than that of the organic insulation film 40 and is approximately 0.3 μm (3,000 Å). The array board side alignment film 11e is configured to align liquid crystal molecules contained in the liquid crystal layer 11c and made of polyimide. The array board side alignment film 11e covers the surfaces of the second interlayer insulation film 41 and the pixel electrodes 18 and faces the liquid crystal layer 11c and is formed over a range of the display area AA and the non-display area NAA of the array board 11b in solid patterns. Specifically, the array board side alignment film 11e is arranged in a whole area of the surface of the display area AA and the inner peripheral portion of the non-display area NAA (a portion next to the display area AA). The array board side alignment film 11e is a photo-alignment film that aligns the liquid crystal molecules along an irradiation direction of light upon irradiation of the light having a specific wave length region (such as ultraviolet rays). The first transparent electrode film 23 and the second transparent electrode film 24 among the films are formed only in the display area AA of the array board 11b, that is, are not formed in the non-display area NAA. The insulation films made of insulating materials including the gate insulator 35, the protection film 37, the first interlayer insulation film 39, the organic insulation film 40, and the second interlayer insulation film 41 are formed in solid patterns arranged in a whole area of the surface of the array board 11b (partially having holes). The first metal film 34, the semiconductor film 36, and the second metal film 38 are formed in predetermined patterns in the display area AA and the non-display area NAA of the array board 11b.

Next, configurations of components in the display area AA of the array board 11b will be described in sequence. As illustrated in FIG. 5, in the display area AA of the array board 11b, a number of thin film transistors (TFTs, display components) 17, which are switching components, and a number of pixel electrodes 18 are disposed in a matrix. Gate lines (scanning signal lines, row control lines) 19 and source lines (column control lines, data lines) 20 are routed in a matrix such that each pair of display area TFT 17 and the pixel electrode 18 is in a cell defined by the gate lines 19 and the source lines 20. Namely, the TFTs 17 and the pixel electrodes 18 are disposed in parallel to be arranged in a matrix at respective corners defined by the gate lines 19 and the source lines 20 that are formed in a matrix. The gate lines 19 are formed from the first metal film 34 and the source lines 20 are formed from the second metal film 38. The gate insulator 35 and the protection film 37 are interposed between the gate line 19 and the source line 20 at an intersection thereof. The gate lines 19 and the source lines 20 are connected to gate electrodes 17a and source electrodes 17b of the TFTs 17, respectively. The pixel electrodes 18 are connected to drain electrodes 17c of TFTs 17 (FIG. 6). The gate line 19 is disposed overlapping one end (the lower end in FIG. 5) of the pixel electrode 18 in a plan view (viewed from the normal line direction relative to the plate surface of the array board 11b (glass substrate GS)). In addition, the array board 11b is provided with an auxiliary capacitor line (storage capacitor line, Cs line) 25 that is in parallel to the gate line 19 and overlaps a portion of the pixel electrode 18 in a plan view. The auxiliary capacitor line 25 is made of the first metal film 34 same as the gate line 19, and is provided overlapping the other end (the upper end in FIG. 5) in the pixel electrode 18 in a plan view, i.e., on the opposite side with the center of the pixel electrode 18 interposed between the auxiliary capacitor line 25 and the gate line 19 in the Y-axis direction. In other words, the auxiliary capacitor line 25 is provided adjacent to the gate line 19 while a predetermined gap is maintained therebetween in the Y-axis direction. The gate line 19 is connected to the pixel electrode 18 adjacent to the pixel electrode 18 on the upper side overlapping the auxiliary capacitor line 25 via the TFT 17 as illustrated in FIG. 5. The auxiliary capacitor lines 25 and the gate lines 19 are alternately disposed in the Y-axis direction.

As illustrated in FIG. 5, the TFT 17 is mounted on the gate line 19, i.e., disposed entirely overlapping the gate line 19 in a plan view. A portion of the gate line 19 constitutes the gate electrode 17a of the TFT 17, and the portion of the source line 20 that overlaps the gate line 19 in a plan view constitutes the source electrode 17b of the TFT 17. The TFT 17 includes the drain electrode 17c, which has an island shape by being disposed opposite to the source electrode 17b with a predetermined gap therebetween in the X-axis direction. The drain electrode 17c is formed from the second metal film 38, which is the same as the source electrode 17b (source line 20), and is disposed overlapping one end of the pixel electrode 18 (portion where a later-described slit 18a is not formed) in a plan view. The drain electrode 17c has a drain line 27 formed from the same second metal film 38 connected thereto. The drain line 27 is extended from the connected drain electrode 17c in the Y-axis direction toward the lower side in FIG. 5, i.e., toward the auxiliary capacitor line 25, and an extension end thereof is provided with a capacitance formation portion 27a forming capacitance by overlapping the auxiliary capacitor line 25 and the next pixel electrode 18 (specifically, the pixel electrode 18 adjacent to and below the pixel electrode 18 connected to the drain electrode 17c in FIG. 5) in a plan view. The portion of the gate line 19 not overlapping the source line 20 in a plan view is formed to have a larger line width than the portion overlapping the source line 20 in a plan view, while the portion of the source line 20 overlapping the gate line 19 and the auxiliary capacitor line 25 in a plan view is formed to have a larger line width than the portion not overlapping the gate line 19 and the auxiliary capacitor line 25 in a plan view.

As illustrated in FIG. 6, the TFT 17 includes the gate electrode 17a formed from the first metal film 34, a channel 17d formed from the semiconductor film 36 and disposed so as to overlap the gate electrode 17a in a plan view, a protection portion 17e formed from the protection film 37 and including two openings 17e1 and 17e2 that penetrate at positions overlapping the channel 17d in a plan view, the source electrode 17b formed from the second metal film 38 and connected to the channel 17d via one of the openings 17e1 and 17e2, specifically the opening 17e1, and the drain electrode 17c formed from the second metal film 38 and connected to the channel 17d via the other one of the openings 17e1 and 17e2, specifically the opening 17e2. The gate electrode 17a includes a portion of the gate line 19 overlapping at least the source electrode 17b, the drain electrode 17c, and the channel 17d in a plan view. The channel 17d extends along the X-axis direction and bridges between the source electrode 17b and the drain electrode 17c to allow a flow of electrons between the electrodes 17b and 17c. The semiconductor film 36 that forms the channel 17d is an oxide semiconductor thin film. The oxide semiconductor thin film has electron mobility higher than that of an amorphous silicon thin film, for example, 20 to 50 times higher. Therefore, the TFTs 17 can be easily downsized and the amount of transmitted light through each pixel electrode 18 can be increased to the maximum level. This configuration is preferable for enhancement of image resolution and reduction of power consumption of the backlight device 14. Further, the channel 17d that is formed of an oxide semiconductor thin film enhances the off-characteristics of the TFT 17 and off-leak current is greatly reduced, for example one percent ($1/100$), compared to the channel formed of amorphous silicon. Therefore, the voltage retention rate of the pixel electrode 18 is increased and it is effective to reduce power consumption of the liquid crystal panel 11. Each TFT 17 including the oxide semiconductor thin film is an inverted-staggered type having a configuration in which the gate electrode 17a is disposed at the bottom and the channel 17d is disposed thereon with the gate insulator 35 interposed therebetween. A stacking structure of the TFT 17 is similar to that of a commonly-used TFT including an amorphous silicon thin film.

Each pixel electrode 18 is formed from the second transparent electrode film 24 as illustrated in FIG. 6. The pixel electrode 18 has a vertically-long rectangular overall shape (approximately rectangular shape) in a plan view and disposed in an area defined by the gate lines 19 and the source lines 20. One end of the pixel electrode 18 overlaps the gate line 19 in a plan view and the portion excluding the overlapping portion does not overlap the gate line 19 in a plan view. The non-overlapping portion includes a plurality of longitudinal slits 18a (two in FIG. 5), with which a comb-shaped portion is formed. This slit 18a extends to the portion of the pixel electrode 18 that overlaps the gate line 19 in a plan view. The lower end of the pixel electrode 18 in FIG. 5 is positioned between the lowest end position of the gate line 19 and the lowest end position of the drain electrode 17c, specifically closer to the lower end position of the drain electrode 17c. The pixel electrode 18 is formed on the second interlayer insulator 41 and the second interlayer insulator 41 exists between the pixel electrode 18 and the common electrode 22, which will be described below. Under the pixel electrode 18, the first interlayer insulator 39, the organic insulator 40, and the second interlayer insulator 41 are disposed. Portions of them overlapping the drain electrode 17c and the pixel electrode 18 in a plan view include contact holes (contact holes, first contact holes) 26 that penetrate from the top to the bottom. The pixel electrode 18 is connected to the drain electrode 17c via the contact holes 26. Thus, when current is supplied to the gate electrode 17a of the TFT 17, current flows between the source electrode 17b and the drain electrode 17c through the channel 17d and a predetermined potential is applied to the pixel electrode 18.

The common electrode 22 is formed from the first transparent electrode film 23. The common electrode 22 is a solid electrode disposed in a substantially whole area of the display area AA of the array board 11b. The common electrode 22 is sandwiched between the organic insulator 40 and the second interlayer insulator 41 as illustrated in FIG. 6. A common potential (a reference potential) is applied to the common electrode 22 through a common line, which is not illustrated. By controlling the potential to be applied to the pixel electrode 18 by the TFT 17 as described above, a predetermined potential difference is generated between the electrodes 18 and 22. If the potential difference is generated between the electrodes 18 and 22, a fringe field (an oblique field) including a component in a direction normal to a plate surface of the array board 11b is applied to the liquid crystal layer 11c in addition to a component in a direction along the plate surface of the array board 11b because of the slit 18a of the pixel electrode 18. Therefore, not only alignment of the liquid crystal molecules in the slit 18a in the liquid crystal layer 11c but also alignment of the liquid crystal molecules on the pixel electrode 18 is properly switchable. With this configuration, the aperture ratio of the liquid crystal panel 11 increases and a sufficient amount of transmitted light is obtained. Furthermore, high view-angle performance is achieved. The common electrode 22 is provided with an opening 22a in a portion overlapping a portion of the TFT 17 in a plan view (specifically, in the range of an approximately rectangular shape surrounded by a two-dot chain line in FIG. 5).

Next, configurations of components in the display area AA of the CF board 11a will be described in detail. As illustrated in FIG. 4, the CF board 11a includes a color filter 11h and a light blocking portion (a black matrix) 11i on an inner surface side thereof (a liquid crystal layer 11c side, a side opposite the array board 11b) such that the color filter 11h and the light blocking portion 11i are layered on thereon. The color filter 11h is disposed on a relatively upper layer side and the light blocking portion 11i is disposed on a relatively lower layer side. The color filter 11h is formed of a photosensitive resin containing pigment for coloring and is formed on the CF board 11a by a known photolithography method with pattering in the manufacturing process. The color filter 11h includes multiple color portions 11hR, 11hG, 11hB that are arranged in a matrix so as to overlap the pixel electrodes 18 on the array board 11b side in a plan view. Each of the color portions 11hR, 11hG, 11hB has a vertically rectangular outer shape in a plan view like the pixel electrode 18 and constitutes a pixel (a unit pixel) with an opposed pixel electrode 18. The color filters 11h include the color portions 11hR, 11hG, 11hB that represent red, green, and blue. The color portions 11hR, 11hG, 11hB are arranged in repeated sequence along the row direction (the X-axis direction) to form a group of the color portions. The groups of the color potions 11hR, 11hG, 11hB are arranged along the column direction (the Y-axis direction). The light blocking portion 11i is made of photosensitive resin containing a light blocking material (such as carbon black) and have a high light blocking property. The light blocking portion 11i is formed on the CF board 11a with patterning by the known photolithography method in a manufacturing process. The light blocking portion 11i includes a light blocking portion between pixels (a grid light blocking portion) and a frame-shaped light blocking portion. The light blocking portion between pixels is disposed in the display area AA of the CF board 11a to define each of the adjacent color portions 11hR, 11hG, 11hB and prevent mixture of the colors of the pixels. The frame-shaped light blocking portion is disposed in the non-display area NAA of the CF board 11a. Among them, the light blocking portion between pixels is formed in a grid to overlap the gate lines 19 and the source lines 20 on the array board 11b side in a plan view.

As illustrated in FIG. 4, an OC layer (an overcoat layer, an insulation film) 11k is provided on the CF board 11a to cover the color filter 11h and the light blocking portion 11j. The OC layer 11k contains acrylic resin (e.g., polymethyl methacrylate (PMMA)), which is an organic material having photosensitivity similar to the organic insulation film 40. The OC layer 11k is formed with patterning by a known photolithography method in the process of manufacturing the CF board 11a. The OC layer 11k has a film thickness greater than that of the color filter 11h and the light blocking portion 11i and functions as a flattening film. The CF board 11a includes spacers (photo spacers) 111 each of which overlaps a part of the OC layer 11k. The spacer 111 has a post-like shape that projects from the OC layer 11k toward the array board 11b through the liquid crystal layer 11c. A distal end portion of the spacer 111 is in contact with the opposing array board side alignment film 113 to keep a constant distance between the substrates 11a and 11b (a size of the inner space IS), that is a cell gap, in the display area AA. The spacers 111 are arranged in the display area AA for the respective color pixels. The spacers 111 are made of substantially transparent photosensitive resin and are formed on the CF board 11a with patterning by the known photolithography method in the process of manufacturing the CF board 11a. The spacers 111 are arranged to overlap the light blocking portion between pixels of the light blocking portion 11i in a plan view. According to this configuration, the spacers 111 are less likely to block light that is directed from the array board 11b side toward each color portion. Specifically, the spacer 111 overlaps each intersection (the source electrode 17b) of the gate lines 19 and the source lines 20 on the array board 11b in a plan view. As illustrated in FIG. 7, a CF board side alignment film (an alignment film) 11d is disposed on a surface of the OC layer 11k to face the liquid crystal layer 11c to align liquid crystal molecules contained in the liquid crystal layer 11c. The CF board side alignment film 11d is made of polyimide, for example, and disposed over a range of the display area AA and the non-display area NAA of the CF board 11a. Specifically, the CF board side alignment film 11d is disposed over an entire area of the display area AA and the inner peripheral portion of the non-display area NAA (a portion next to the display area AA). The CF board side alignment film 11d is a photo alignment film that aligns the liquid crystal molecules along an irradiation direction of light by irradiation of the light having a specific wavelength (for example, ultraviolet rays).

A driving method of the liquid crystal panel 11 will be described. In driving the liquid crystal panel 11, signals are supplied from the control circuit board 12 to the liquid crystal panel 11 via the driver 21 to control operations of each TFT 17. Scan signals are supplied from the control circuit board 12 to each gate line 19 and data signals are supplied from the control circuit board 12 to each source line via the driver 21 so that TFT 17 groups are scanned in sequence along the row direction. Each TFT 17 group includes a group of pixels arranged in the column direction. Accordingly, the pixel electrodes 18 included in the group of pixels are charged in sequence along the row direction. Such driving may be executed by a driving method (off-driving) where an off period (a non-refresh period, a non-refresh frame) in which all the gate lines 19 are in non-scanning state to stop refreshing the screen is included after a scanning period (a refresh period, a refresh frame) in which all the gate lines 19 are scanned to refresh the screen. Accordingly, the operations of the control circuit board 12 and the driver 21 are stopped and power consumption of the liquid crystal display device 10 is reduced. If such off driving is executed, voltage of the charged pixel electrode 18 may be dropped due to the scanning. If current leaks from the TFT 17 or the pixel electrode 18, voltage of the charged pixel electrode 18 that is charged in the scanning period is likely to be dropped during the off period. Accordingly, the alignment of the liquid crystal molecules in the liquid crystal layer 11$c$ may be changed and the amount of light transmission through the pixels may be changed and thus, the display quality may be lowered. In this embodiment, the TFT 17 includes the oxide semiconductors as the semiconductor film 36, and off-leak current of the TFTs 17 is reduced. Accordingly, the voltage retention rate of the pixel electrode 18 is enhanced and it is preferable to execute the off driving. The off driving is executed when the liquid crystal display panel 11 displaying a still image.

Figure 9:
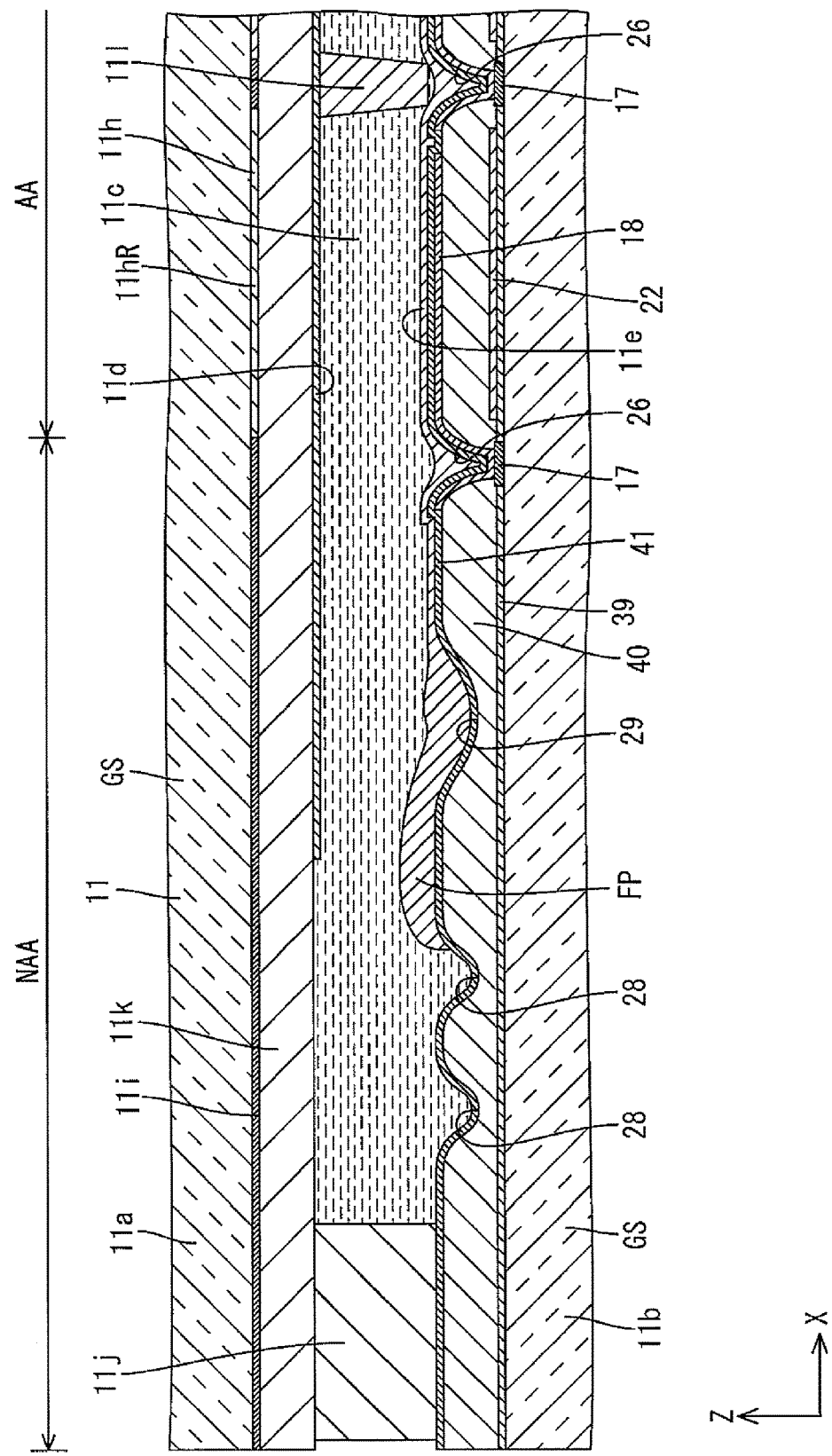
FIG. 9 is a cross-sectional view cut along line ix-ix in FIG. 7.

As illustrated in FIGS. 7 and 9, the array board 11$b$ of the above-structured liquid crystal panel 11 includes a film forming area restricting portion 28 that restricts an area where the array board side alignment film 11$e$ is formed. In the process of manufacturing the array board 11$b$, a material for the array board side alignment film 11$e$ is supplied to the display area AA by an ink jet device and the material is spread over a plate surface of the array board 11$b$ so that the array board side alignment film 11$e$ is formed. In this process, the film forming area restricting portion 28 restricts the area where the material for the array board side alignment film 11$e$ spreads. Accordingly, the material is less likely to be adhered to a portion where the sealing member 11$j$ is to be disposed or a portion where the driver 21 or the flexible board 13 is to be mounted (a connection terminal to which the driver 21 or the flexible board 13 is to be connected). Hereinafter, the film forming area restricting portion 28 will be described in detail. In FIG. 7, the film forming area restricting portion 28 is illustrated by a thick line.

Figure 8:
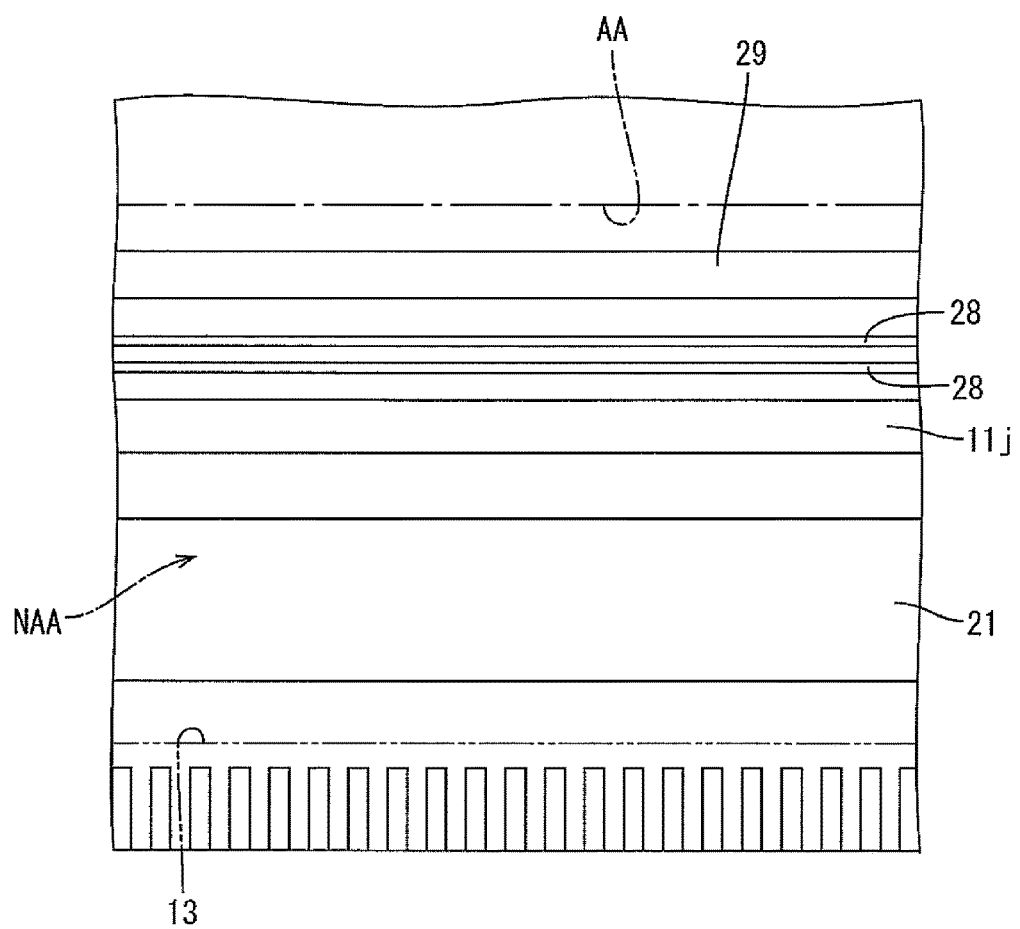
FIG. 8 is a plan view illustrating a part of FIG. 7 (an edge portion including the driver).

As illustrated in FIGS. 7 and 9, the film forming area restricting portion 28 is a recess in a part of a surface of the organic insulation film 40 in the non-display area NAA of the array board 11$b$. The film forming area restricting portion 28 is a groove having an arc (curved) cross-sectional shape. The film forming area restricting portion 28 is closer to the display area AA than the sealing member 11$j$ in the non-display area NAA and has a plan view frame shape (endless loop) surrounding an entire periphery of the display area AA. Namely, the film forming area restricting portion 28 is on an inner peripheral side with respect to the sealing member 11$j$ in the non-display area NAA and has a frame shape along the sealing member 11$j$ over an entire periphery thereof. As illustrated in FIGS. 8 and 9, two film forming area defining portions 28 are provided parallel to each other, and one is on an inner peripheral side (relatively closer to the display area AA) and another one is on an outer peripheral side (relatively closer to the sealing member 11$j$) in the non-display area NAA. The two film forming area defining portions 28 are spaced from each other with a predetermined distance. According to such a configuration, in forming the array board side alignment film 11$e$, even if the inner-side film forming area restricting portion 28 does not effectively stop flowing of the material for the array board side alignment film 11$e$, the outer-side film forming area restricting portion 28 stops the flowing of the material for the array board alignment film 11$e$. The second interlayer insulation film 41 is layered on the upper side of the organic insulation film 40 having the film forming area restricting portions 28, and portions of the second interlayer insulation film 41 overlapping the film forming area restricting portions 28 have a cross-sectional shape that is curved arc shape along that of the film forming area restricting portions 28.

Figure 10:
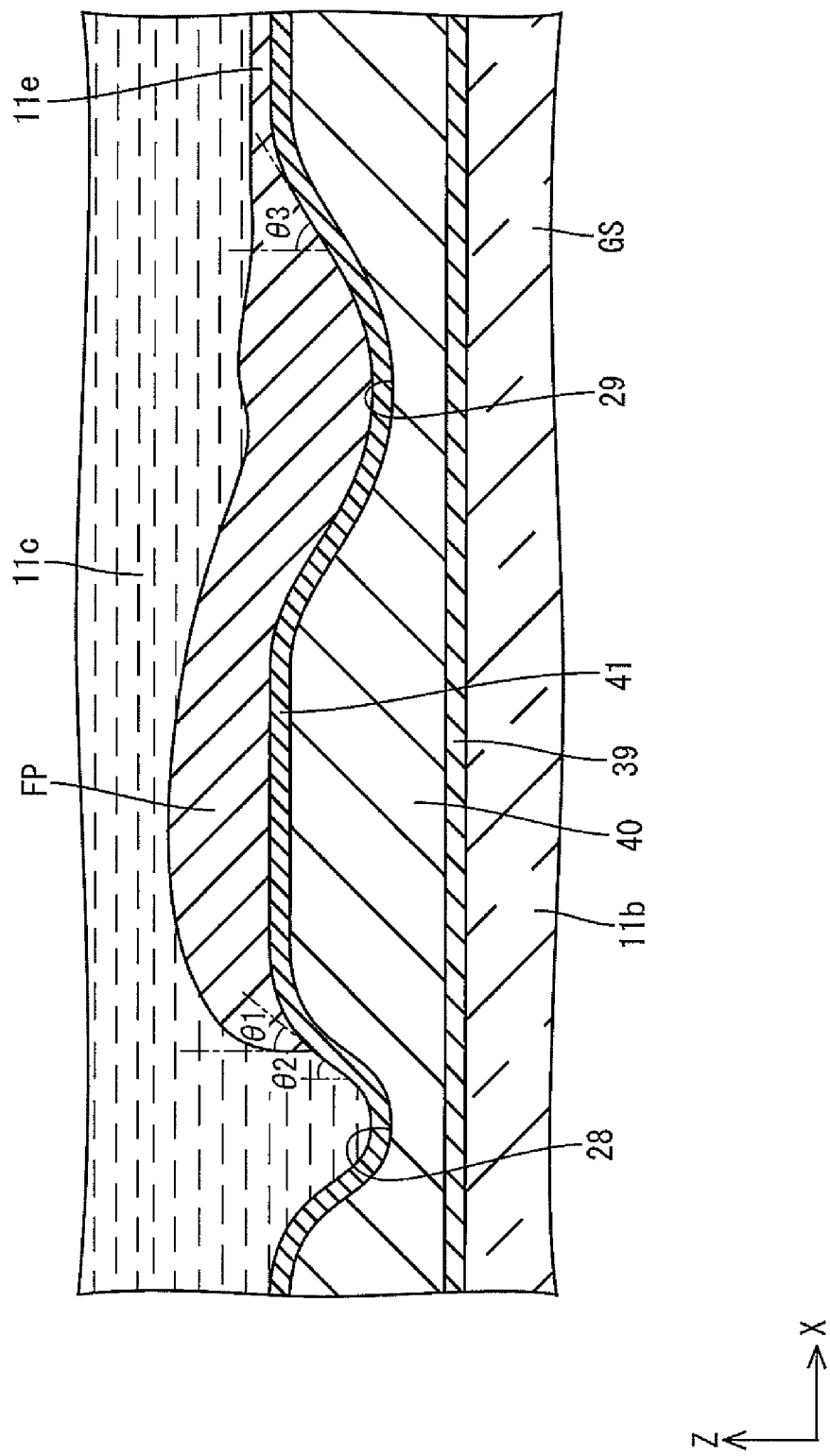
FIG. 10 is a cross-sectional view illustrating a part of FIG. 9 (a film forming area restricting portion and an alignment film material storing portion).

As illustrated in FIG. 9, a side (inner) surface of the film forming area restricting portion 28 is inclined with respect to a normal line of the glass substrate GS (the Z-axis direction) at an inclination angle. The inclination angle is set to a certain value such that the side surface holds the material for the array board side alignment film 11$e$ spreading outward from the display area AA side when forming the array board side alignment film 11$e$ and stops further spread of the material. Specifically, as illustrated in FIG. 10, the side surface of the film forming area restricting portion 28 and the normal line of the glass substrate GS form an inclination angle that continuously changes in a width direction (the X-axis direction or the Y-axis direction) of the film forming area restricting portion 28. The film forming area restricting portion 28 has a holding portion that holds the material for the array board side alignment film 11$e$. The holding portion and the normal line of the glass substrate GS form an angle $\theta 1$ that would not be a minimum value $\theta 2$. The holding portion of the side surface of the film forming area restricting portion 28 holding the material for the array board side alignment film 11$e$ is closer to the display area AA than the portion of the side surface forming the angle of the minimum value $\theta 2$ with the normal line of the glass substrate GS. Namely, the minimum value $\theta 2$ of the angle formed by the portion of the side surface of the film forming area restricting portion 28 and the normal line of the glass substrate GS is determined so that the material for the array board side alignment film 11$e$ is surely held and unnecessary spread of the material is surely prevented. Specifically, the film forming area restricting portion 28 is formed such that the side surface thereof and the normal line of the glass substrate GS form the angle of the minimum value $\theta 2$ that is 50 degrees or less. In FIG. 10, the minimum value $\theta 2$ of the angle formed by the side surface of the film forming area restricting portion 28 and the normal line of the glass substrate GS is approximately 50 degrees. The angle $\theta 1$ that is formed by the holding portion (holding the material for the array board side alignment film 11$e$) of the side surface of the film forming area restricting portion 28 and the normal line of the glass substrate GS may be referred to as a flow restriction angle for restricting flowing of the material for the array board side alignment film 11$e$. If the angle formed by the side surface and the normal line is greater than the flow restriction angle $\theta 1$, the flow of the material for the array board side alignment film 11$e$ can be restricted, and if the angle is smaller than the flow restriction angle $\theta 1$, the flow of the material for the array board side alignment film 11$e$ is less likely to be restricted. The flow restriction angle $\theta 1$ is determined by a surface tension and viscosity of the material for the array board side alignment film 11$e$. As an angle formed by the side surface of the film forming area restricting portion 28 and the normal line of the glass substrate GS is smaller, the side surface forms a steep slope, and as the angle is greater, the side surface forms a gentle slope. As described before, the film forming area restricting portion 28 is disposed in the non-display area NAA of the array board 11$b$ and is formed by partially recessing the surface of the organic insulation film 40 included in the insulation film. Accordingly, the area where the array board side alignment film 11e is formed is defined.

In forming the array board side alignment film 11e, the material for the array board side alignment film 11e held by the side surface of the film forming area restricting portion 28 is returned from the holding portion (an outermost edge of the array board side alignment film 11e) toward the display area AA, as illustrated in FIG. 9. The returned material is solidified with thickened. Therefore, the array board side alignment film 11e locally includes a thick portion FP ranging a certain length from the outermost edge thereof, which is the holding portion of the material. If the array board side alignment film 11e includes the thick portion FP not only in the non-display area but also in the display area AA, unevenness may be caused in the thickness of the array board side alignment film 11e in the display area AA. If unevenness is caused in the thickness of the array board side alignment film 11e in the display area AA, the display quality of images appearing on the display panel 11 may be deteriorated. Particularly in the liquid crystal display device 10 having a small-sized frame, a distance between the display area AA and the holding portion of the film forming area restricting portion 28 holding the material for the array board side alignment film 11e is decreased. Therefore, the thick portion FP is likely to be formed in the display area AA and the display quality is likely to be deteriorated.

As illustrated in FIGS. 7 and 9, the array board 11b according to this embodiment includes an alignment film material storing portion 29 that stores the material for the array board side alignment film 11e in forming the array board side alignment film 11e. The alignment film material storing portion 29 is disposed in the non-display area NAA of the array board 11b and formed by partially recessing a surface of the organic insulation film 40. The alignment film material storing portion 29 is a groove having a substantially arc (curved) cross sectional shape. The alignment film material storing portion 29 has an inner side surface and the side surface and the normal line of the glass substrate GS form an angle that is greater than the angle formed by the side surface of the film forming area restricting portion 28 and the normal line. According to such a configuration, the side surface of the alignment film material storing portion 29 is less likely to restrict the spread of the material for the array board side alignment film 11e and therefore, the material is likely to be stored in the alignment film material storing portion 29. Thus, the material for the array board side alignment film 11e is held by the side surface of the film forming area restricting portion 28 and even if such a material is returned toward the display area AA and the thick portion FP is generated in the array board side alignment film 11e, the area where the thick portion FP is formed is reduced by the amount of the material for the array board side alignment film 11e stored in the alignment film material storing portion 29. Therefore, the thick portion FP is less likely to be formed in the display area AA. Accordingly, the thickness of the array board side alignment film 11e is uniform in the display area AA, and the display quality of the display panel 11 including the CF board 11a is improved and the frame size is preferably reduced. Hereinafter, the alignment film material storing portion 29 will be described in detail.

The alignment film material storing portion 29 is disposed closer to the display area AA than the film forming area restricting portion 28 within the non-display area NAA and has a frame-like shape (an endless loop shape) surrounding an entire periphery of the display area AA. Namely, the alignment film material storing portion 29 is on an inner peripheral side with respect to the film forming area restricting portion 28 in the non-display area NAA and has a frame-like shape along the film forming area restricting portion 28 over an entire periphery thereof. The alignment film material storing portion 29 is necessarily between the display area AA and the film forming area restricting portion 28 on the array board 11b. According to such a configuration, if the material for the array board side alignment film 11e spreads outward from the display area AA side in forming the array board side alignment film 11e, the alignment film material storing portion 29 is necessarily filled with the material and afterwards the material flows toward the film forming area restricting portion 28. Therefore, the thickness of the array board side alignment film 11e is uniform over the entire periphery of the display area AA.

As illustrated in FIGS. 8 and 9, the alignment film material storing portion 29 has a depth dimension substantially same as that of the film forming area restricting portion 28, and the alignment film material storing portion 29 has a width dimension greater than that of the film forming area restricting portion 28. According to such a configuration, the alignment film material storing portion 29 can store a great amount of the material for the array board side alignment film 11e. Therefore, the thickness of the array board side alignment film 11e is preferably uniform in the display area AA. Further, the depth dimension of the alignment film material storing portion may be increased than that of the film forming area restricting portion 28 to increase a capacity within the alignment film material storing portion. The alignment film material storing portion 29 having the increased depth dimension is easily formed in the organic insulation film 40 with patterning by the photolithography method compared to a case that the organic insulation film 40 is exposed with using a photomask. If the organic insulation film is exposed with using a photomask to form the alignment film material storing portion 29 having an increased depth, it is difficult to control a light exposure amount. The alignment film material storing portion 29 is disposed spaced from the inner peripheral side film forming area restricting portion 28 with a certain distance. The certain distance is greater than a distance between the two film forming area defining portions 28 or a distance between the outer peripheral side film forming area restricting portion 28 and the sealing member 11j. The second interlayer insulation film 41 that is layered on an upper layer side of the organic insulation film 40 having the alignment film material storing portion 29 has an overlap portion overlapping the alignment film material storing portion 29 in a plan view. The overlap portion of the second interlayer insulation film 41 has an arc (curved) cross-sectional shape along the shape of the alignment film material storing portion 29. The organic insulation film 40 includes the film forming area restricting portion 28 and the alignment film material storing portion 29 in the non-display area NAA and partially includes recessed portions. Thus, the thickness of the organic insulation film 40 is not uniform and varies. On the other hand, the first interlayer insulation film 39 and the second interlayer insulation film 41 have a thickness that is substantially uniform over an entire area of the non-display area.

As illustrated in FIG. 9, a side surface of the alignment film material storing portion 29 is inclined with respect to a normal line of the glass substrate GS (the Z-axis direction) at an inclination angle and the inclination angle is determined as follows. Accordingly, in forming the array board side alignment film 11e, the material for the array board side alignment film 11e flows into the alignment film material storing portion 29 without held by the side surface of the alignment film material storing portion 29. Specifically, as illustrated in FIG. 10, the side surface of the alignment film material storing portion 29 and the normal line of the glass substrate GS form an inclination angle that continuously changes in a width direction (the X-axis direction or the Y-axis direction) of the alignment film material storing portion 29. The film forming area restricting portion 28 has a holding portion that holds the material for the array board side alignment film 11e. The inclination angle of the alignment film material storing portion 29 is set so that a minimum value θ3 of the inclination angle is greater than the angle (the flow restriction angle) θ1 formed by the holding portion and the normal line of the glass substrate GS. According to such a configuration, the flow of the material for the array board side alignment film 11e is not restricted by the side surface of the alignment film material storing portion 29. Therefore, the material is likely to flow into the alignment film material storing portion 29 and is surely stored therein. Further, the side surface of the alignment film material storing portion 29 has substantially same cross-sectional shape over an entire area thereof and forms a same inclination angle with respect to the normal line of the glass substrate GS at any points of the cross section thereof in a peripheral direction. Therefore, the side surface of the alignment film material storing portion 29 and the normal line of the glass substrate GS form the angle of a minimum value θ2 that is greater than the flow restriction angle θ1 over an entire area of the side surface. Specifically, the alignment film material storing portion 29 is formed such that the side surface thereof and the normal line of the glass substrate GS form the angle of the minimum value θ3 from 60 degrees to 80 degrees. More preferably, the alignment film material storing portion 29 is formed such that the side surface thereof and the normal line of the glass substrate GS form the angle of the minimum value θ3 from 70 degrees to 80 degrees. In FIG. 10, the minimum value θ3 of the angle formed by the side surface of the alignment film material storing portion 29 and the normal line of the glass substrate GS is approximately 75 degrees. As an angle formed by the side surface of the alignment film material storing portion 29 and the normal line of the glass substrate GS is smaller, the side surface forms a steep slope, and as the angle becomes greater, the side surface forms a gentle slope. Namely, the side surface of the alignment film material storing portion 29 is a more gentle slope than the side surface of the film forming area restricting portion 28, and the side surface of the film forming area restricting portion 28 is a more steep slope than the side surface of the alignment film material storing portion 29. As described before, the alignment film material storing portion 29 is disposed closer to the display area AA than the film forming area restricting portion 28 in the non-display area NAA of the array board 11b and formed by partially recessing a surface of the organic insulation film 40. The side surface of the alignment film material storing portion 29 and the normal line of the glass substrate GS form an angle that is greater than the angle formed by the side surface of the film forming area restricting portion 28 and the normal line. According to such a configuration, the alignment film material storing portion 29 stores the material for the array board side alignment film 11e.

The liquid crystal panel 11 has such configurations and a method of manufacturing the liquid crystal panel 11 will be described next. The liquid crystal panel 11 according to this embodiment is manufactured via an array board manufacturing process of manufacturing the array board 11b, a CF board manufacturing process of manufacturing the CF board 11a, and a bonding process of bonding the array board 11b and the CF board 11a. In this embodiment, the CF board manufacturing process and the bonding process are not described and the array board manufacturing process will be described in detail.

The array board manufacturing process will be described. In the array board manufacturing process, on the glass substrate GS constituting the array board 11b, the first metal film 34, the gate insulation film 35, the semiconductor film 36, the protection film 37, the second metal film 38, the first interlayer insulation film 39, the organic insulation film 40, the first transparent electrode film 23, the second interlayer insulation film 41, the second transparent electrode film 24, and the array board side alignment film 113 are formed in this sequence. Thus, the array board 11b is manufactured. The organic insulation film 40 made of a photosensitive resin is formed on the glass substrate GS by the photolithography method with patterning. In forming the organic insulation film 40, a halftone mask 30 having the following structure is used to form the alignment film material storing portion 29 having the side surface that is a slope more gentle than the side surface of the film forming area restricting portion 28.

Figure 11:
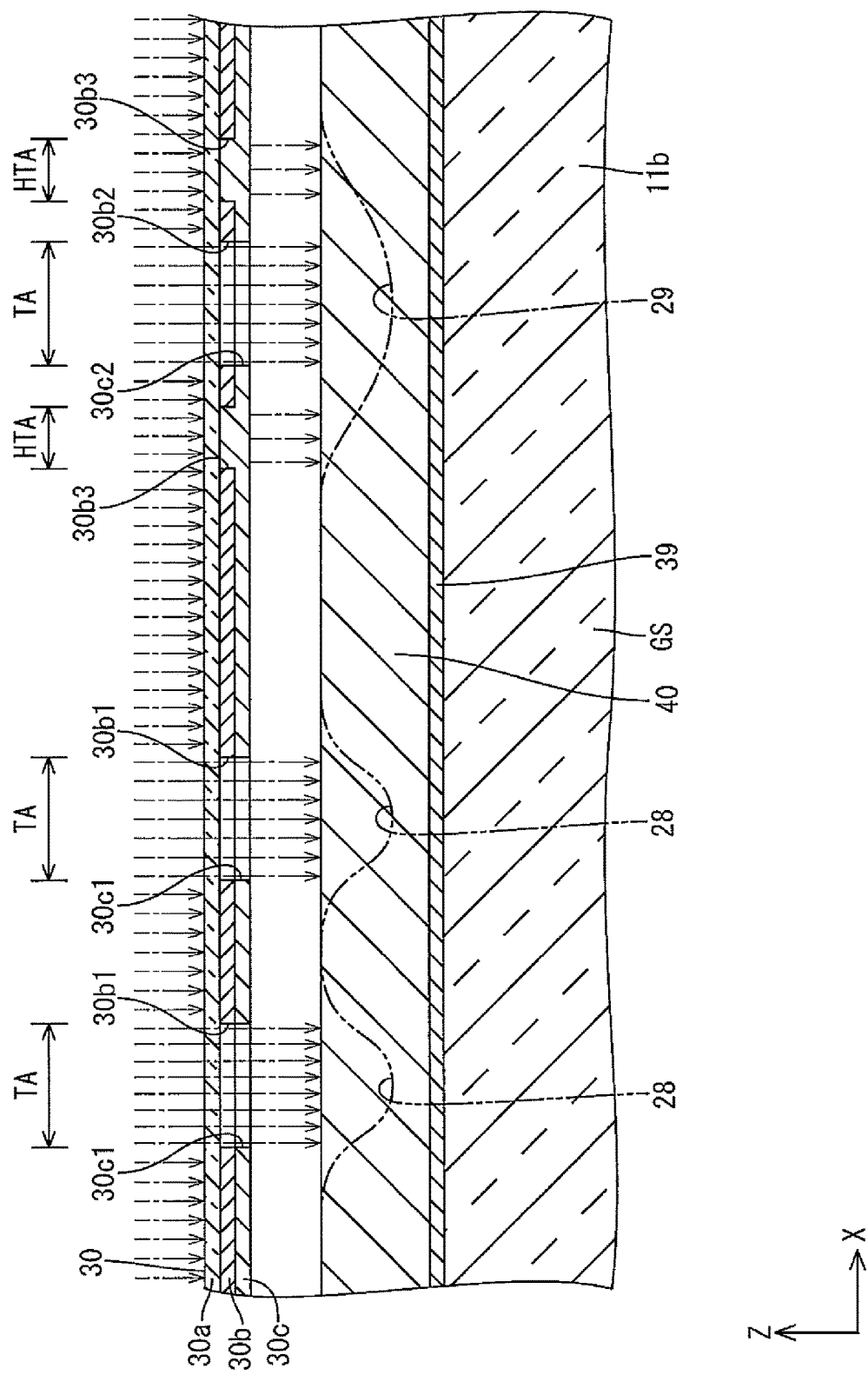
FIG. 11 is a cross-sectional view cut along line ix-ix similarly to FIG. 9 and illustrating a process of exposing an organic insulating film using a half tone mask in a process of manufacturing the array board.

As illustrated in FIG. 11, the halftone mask 30 includes a transparent glass substrate 30a, a light blocking film 30b, and a semitransparent film 30c. The light blocking film 30a is formed on a plate surface of the glass substrate 30a and blocks exposure light from a light source. The semitransparent film 30c is formed on the plate surface of glass substrate 30a and transmits therethrough the exposure light from the light source at a certain transmission rate. The light transmission of the exposure light through the light blocking film 30b is substantially 0%. The semitransparent film 30c is layered on the light blocking film 30b on a side opposite from the glass substrate 30a side and has light transmission of the exposure light ranging from 10% to 70%, for example. The light blocking film 30b and the semitransparent film 30c included in the halftone mask 30 have holes corresponding to the positions of contact holes 26, the film forming area restricting portion 28, and the alignment film material storing portion 29 that are to be formed in the organic insulation film 40. Specifically, the light blocking film 30b and the semitransparent film 30c have holes for the contact holes corresponding to the positions of the contact holes 26 to be formed, and have defining portion holes 30b1, 30c1 corresponding to the positions of the film forming area restricting portions 28 to be formed, and have storing portion holes 30b2, 30b3, 30c2 corresponding to the positions of the alignment film material storing portion 29 to be formed. The holes for the contact holes are not illustrated in the drawing. The light blocking film 30b and the semitransparent film 30c have the defining portion holes 30b1, 30c1 that are overlapped with each other over an entire area in a plan view. Therefore, the portion corresponding to the holes 30b1, 30c1 is a transmission area TA where the exposure light from the light source transmits at light transmission of substantially 100%. On the other hand, the storing portion holes 30b2, 30b3, 30c2 include a first storing portion hole 30b2 and a second storing portion hole 30b3 formed in the light blocking film 30b and a third storing portion hole 30c2 formed in the semitransparent film 30c. Among them, the first storing portion hole 30b2 and the third storing portion hole 30c2 are overlapped with each other over an entire area, and the second storing portion hole 30b3 is not overlapped with the third storing portion hole 30c2 in a plan view. Accordingly, the first storing portion hole 30b2 and the third storing portion hole 30c2 that are overlapped with each other correspond to the transmission area TA where the exposure light from the light source transmits at light transmission of substantially 100%. The second storing portion hole 30b3 formed only in the light blocking film 30b corresponds to a semi-transmission area HTA where the exposure light from the light source transmits at light transmission same as that of the semitransparent film 30c. A pair of second storing portion holes 30b3 is formed to sandwich the first storing portion hole 30b2 and the second storing portion hole 30b3. One of the second storing portion holes 30b3 is on the inner peripheral side (on the display area AA side) and another one is on the outer peripheral side (on the film forming area restricting portion 28 side). The portions where the light blocking portion 30b is formed correspond to a light blocking area where the exposure light transmits at light transmission of substantially 0% regardless of whether the semitransparent film 30c is disposed or not.

The organic insulation film 40 is developed after irradiation of the exposure light from the light source through the above structured halftone mask 30. As illustrated in FIG. 11, the contact hole 26, the film forming area restricting portion 28, and a middle portion of the alignment film material storing portion 29 are formed in respective portions of the organic insulation film 40 overlapping the transmission area TA in a plan view. Two edge portions of the alignment film material storing portion 29 are formed in respective portions of the organic insulation film 40 overlapping the semi-transmission area HTA in a plan view. According to such a configuration, the side surface of the alignment film material storing portion 29 is formed to be a slope that is more gentle than that of the film forming area restricting portion 28.

Figure 12:
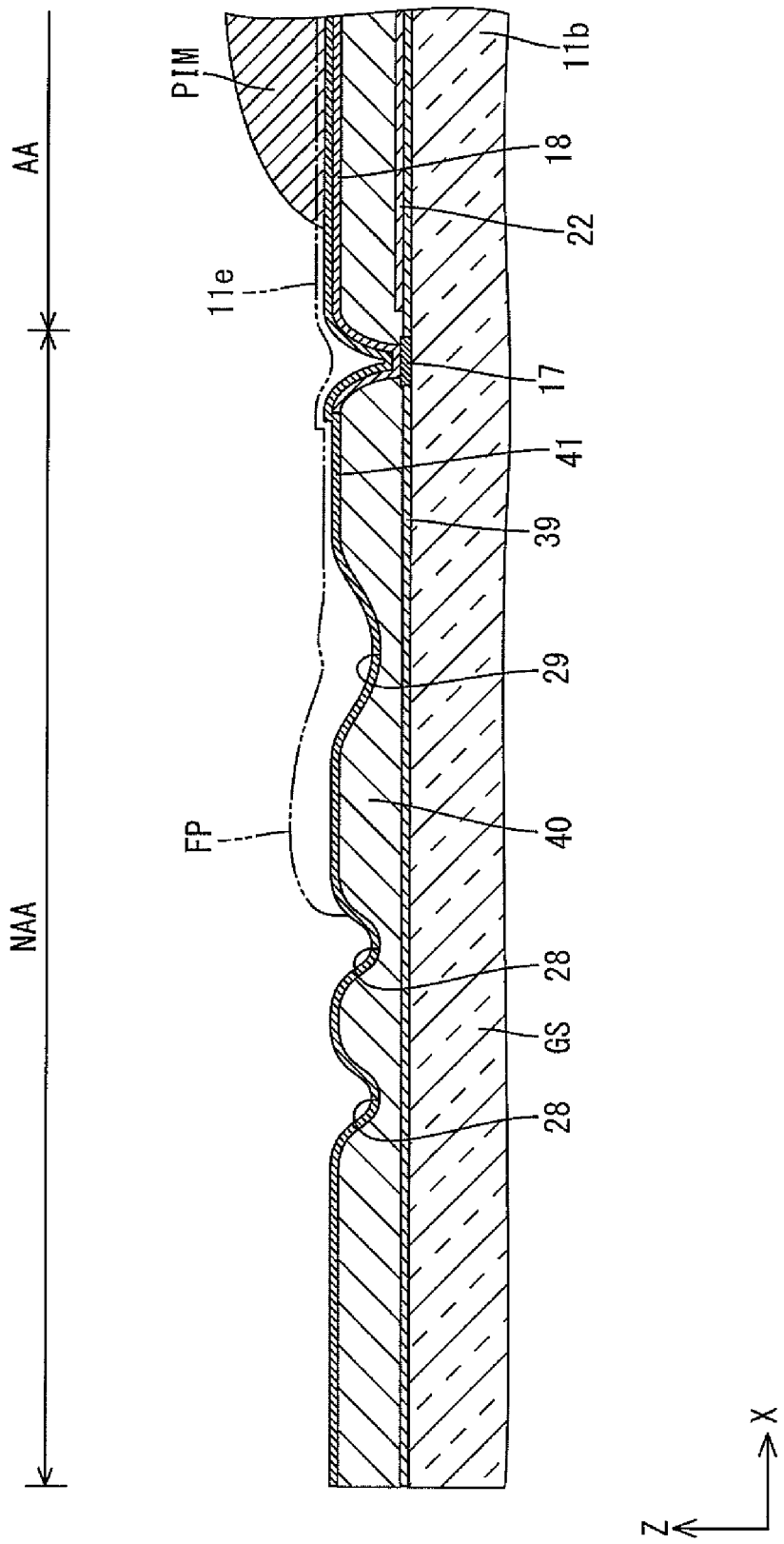
FIG. 12 is a cross-sectional view illustrating that a material for an array board-side alignment film is supplied in the process of manufacturing the array board.

Next, a process of forming the array board side alignment film 11e will be described in detail. In forming the array board side alignment film 11e, droplets PIM, which are a material for the array board side alignment film 11e, are ejected through nozzles of the ink jet device onto the glass substrate GS, which constitutes the array board 11b, and impacted on the display area AA of the glass substrate GS. As illustrated in FIG. 12, the droplets PIM impacted on the display area AA of the glass substrate GS, which constitutes the array board 11b, spread over the surface of the second interlayer insulation film 41 from the respective impacted positions so that the adjacent droplets PIM spread to be continuous to each other. Accordingly, the array board side alignment film 11e is formed. The droplets PIM impacted on the outermost portion in the display area AA spread toward the non-display area NAA and first reach the alignment film material storing portion 29. The alignment film material storing portion 29 is formed such that the side surface thereof and the normal line of the glass substrate GS form the angle of a minimum value θ3 that is greater than the flow restriction angle θ1. Therefore, the droplets PIM for the array board side alignment film 11e are not held by the side surface of the alignment film material storing portion 29 and smoothly flow into the alignment film material storing portion 29. The droplets PIM for the array board side alignment film 11e further spread outwardly therefrom after the alignment film material storing portion 29 is filled with the droplets PIM.

If the droplets PIM for the array board side alignment film 11e reach the film forming area restricting portion 28, the droplets PIM are held by the side surface of the film forming area restricting portion 28 at a certain position thereof so as not to spread further outwardly. Accordingly, the material for the array board side alignment film 11e is less likely to be adhered on the portion of the second interlayer insulation film 41 where the sealing member 11j is to be formed or where the driver 21 and the flexible board 13 are to be mounted. Therefore, the sealing properties of the sealing member 11j are effectively maintained and connection errors are less likely to be caused in the driver 21 and the flexible board 13. The sealing properties of the sealing member 11j are effectively maintained so that water or moisture is less likely to enter the liquid crystal layer 11c from outside and therefore, the semiconductor film 36 made of oxide semiconductor included in the TFT 17 is not exposed to water or moisture. Accordingly, the semiconductor film 36 is less likely to change its electrical properties and the properties of the TFTs 17 are less likely to be deteriorated and thus, display errors are less likely to be caused in the liquid crystal panel 11. Since the water or moisture is less likely to enter the liquid crystal layer 11c, only small leak current may be caused in the TFT 17 or the pixel electrode 18. Therefore, voltage of the charged pixel electrode 18 is less likely to be lowered and it is particularly preferable to execute the off driving.

The droplets PIM for the array board side alignment film 11e held by the side surface of the film forming area restricting portion 28 are returned to the inner side from the holding portion and thus, the returned portions of the droplets PIM cause a lifted portion. If the lifted portion is solidified, the solidified portion forms the thick portion FP having a certain width from the holding portion of the material for the array board side alignment film 11e (held by the side surface of the film forming area restricting portion 28). The amount of the material used for the lifting is reduced in forming the array board side alignment film 11e by the amount of the material for the array board side alignment film 11e stored in the alignment film material storing portion 29 recessed in the organic insulation film 40. Therefore, the area where the thick portion FP is formed is reduced. Accordingly, the thick portion FP of the array board side alignment film 11e is less likely to be disposed in the display area AA and therefore, the thickness of the array board side alignment film 11e is substantially uniform in the display area AA. The display quality of display on the liquid crystal panel 11 including the CF board 11a is improved and it is particularly preferable to reduce the size of a frame portion.

As described before, the array board (the display part) 11b of this embodiment includes the glass substrates (the substrates) GS, the organic insulation film 40, the array board side alignment film (the alignment film) 11e, the film forming area restricting portion 28, and the alignment film material storing portion 29. The glass board (the substrates) GS includes the display area AA and the non-display area NAA surrounding the display area AA. The organic insulation film 40 is disposed over a range of the display area AA and the non-display area NAA and included in the insulation film on the glass substrate GS. The array board side alignment film (the alignment film) 11e is disposed over a range of the display area AA and the non-display area NAA to overlap the surface of the organic insulation film 40 included in the insulation film. The film forming area restricting portion 28 is disposed in the non-display area NAA and formed by partially recessing the surface of the organic insulation film 40 included in the insulation film. The alignment film material storing portion 29 is disposed closer to the display area AA than the film forming area restricting portion 28 in the non-display area NAA and formed by partially recessing the organic insulation film 40 included in the insulation film. At least a portion of the side surface of the alignment film material storing portion 29 and the normal line of the plate surface of the glass substrate GS form an angle and the angle is greater than an angle formed by the side surface of the film forming area restricting portion 28 and the normal line of the glass substrate GS.

In forming the array board side alignment film 11e, the material for the array board side alignment film 11e, which is in a liquid state, is supplied to the display area AA of the glass substrate GS. The material flows and spreads over a surface of the organic insulation film 40 included in the insulation film disposed on the glass substrate GS so that the array board side alignment film 11e is formed to overlap the surface of the organic insulation film 40 included in the insulation film. The array board side alignment film 11e that is disposed over a range of the display area AA and the non-display area NAA is quite surely disposed in the display area AA.

The surface of the organic insulation film 40 included in the insulation film is partially recessed so that the film forming area restricting portion 28 is formed in the non-display area NAA. According to this configuration, in forming the alignment film, the material for the array board side alignment film 11e spreads over the surface of the organic insulation film 40 included in the insulation film from the display area AA side toward the non-display area NAA, and the film forming area restricting portion 28 prevents the material from spreading further outwardly from the film forming area restricting portion 28. Accordingly, the area where the array board side alignment film 11e is formed is defined (restricted). In forming the alignment film, the material for the array board side alignment film. 11e spreading over the surface of the organic insulation film 40 included in the insulation film reaches the film forming area restricting portion 28 and the material is held by the side surface of the film forming area restricting portion 28 so as not to spread further from the holding portion. The material that does not spread is returned from the holding portion toward the display area AA. Therefore, the array board side alignment film 11e locally includes the thick portion FP ranging from the holding portion held by the side surface. If the array board side alignment film 11e includes the thick portion FP not only in the non-display area but also in the display area AA, unevenness may be caused in the thickness of the array board side alignment film 11e in the display area AA. Particularly, if the width of the non-display area NAA is reduced or the frame size is reduced, the thick portion FP is likely to be disposed in the display area AA.

The alignment film material storing portion 29 is disposed closer to the display area AA than the film forming area restricting portion 28 in the non-display area NAA by recessing apart of the organic insulation film 40 included in the insulation film. At least a part of the side surface of the alignment film material storing portion 29 and the normal line of the plate surface of the glass substrate GS form an angle that is greater than an angle formed by the side surface of the film forming area restricting portion 28 and the normal line. According to such a configuration, the spread of the material for the array board side alignment film 11e is less likely to be restricted due to the part of the side surface of the alignment film material storing portion 29 and therefore, the material is stored in the alignment film material storing portion 29. The material for the array board side alignment film 11e is held by the side surface of the film forming area restricting portion 28 and returned toward the display area AA. Accordingly, the thick portion FP is generated in the array board side alignment film 11e. However, the area where the thick portion FP is formed is decreased by the amount of the material for the array board side alignment film 11e stored in the alignment film material storing portion 29. Thus, the thick portion FP is less likely to be formed in the display area AA and the thickness of the array board side alignment film 11e is uniform in the display area AA. Therefore, display quality of display using the array board 11b is improved and it is particularly preferable to decrease the frame size.

The alignment film material storing portion 29 has a width dimension greater than that of the film forming area restricting portion 28. According to such a configuration, the alignment film material storing portion 29 can store a great amount of the material for the array board side alignment film 11e. Therefore, the thickness of the array board side alignment film 11e is preferably uniform in the display area AA. Further, the depth dimension of the alignment film material storing portion 29 may be increased than that of the film forming area restricting portion 28 to increase a capacity within the alignment film material storing portion 29. The alignment film material storing portion 29 having the increased depth dimension is easily formed in the organic insulation film 40 with patterning by the photolithography method compared to a case that the organic insulation film 40 is exposed with using a photomask. If the organic insulation film is exposed with using a photomask to form the alignment film material storing portion 29, it is difficult to control a light exposure amount.

The insulation film includes the interlayer insulation films (the inorganic insulation films) 39, 41 having relatively a small thickness and the organic insulation film 40 having a relatively great thickness. The interlayer insulation films 39, 41 and the organic insulation film 40 are layered and the alignment film material storing portion 29 is formed by recessing at least the organic insulation film 40. The alignment film material storing portion 29 is formed by recessing at least the organic insulation film 40 having a relatively great thickness. Therefore, it is easy to increase the depth or the capacity of the alignment film material storing portion 29 and the greater amount of the material for the array board side alignment film 11e is stored in the alignment film material storing portion 29. Accordingly, the thickness of the array board side alignment film 11e is effectively uniform in the display area AA.

The alignment film material storing portion 29 is disposed to surround the entire periphery of the display area AA. Accordingly, the thickness of the array board side alignment film 11e is uniform over the entire periphery of the display area AA.

The alignment film material storing portion 29 is formed so that the minimum value θ3 of the angle formed by at least a portion of the side surface of the alignment film material storing portion 29 and the normal line is greater than the angle θ1 formed by the portion of the side surface of the film forming area restricting portion 28 holding the material for the array board side alignment film 11e. According to such a configuration, the material for the array board side alignment film 11e is held by at least a portion of the side surface of the alignment film material storing portion 29 and the spread of the material for the array board side alignment film 11e is less likely to be restricted by the holding of the material and therefore, the material is surely stored in the alignment film material storing portion 29.

The alignment film material storing portion 29 is formed such that at least a portion of the side surface thereof and the normal line form the angle of the minimum value θ3 that is from 60 degrees to 80 degrees. If the minimum value θ3 of the angle is greater than 80 degrees, the area where the alignment film material storing portion 29 is formed on the plate surface of the glass substrate GS is necessary to be increased to keep the effective capacity of the alignment film material storing portion 29. Therefore, the width of the non-display area NAA is hardly reduced and the size reduction of the frame is less likely to be achieved. On the other hand, if the minimum value θ3 of the angle is smaller than 60 degrees, the material for the array board side alignment film 11e is likely to be held by the side surface of the alignment film material storing portion 29 in forming the array board side alignment film 11e. Therefore, the material may be less likely to be stored in the alignment film material storing portion 29. With the configuration that the alignment film material storing portion 29 is formed to have the angle of the minimum value θ3 within the range from 60 degrees to 80 degrees, it is preferable to reduce the frame size and the material for the array board side alignment film 11e is surely stored in the alignment film material storing portion 29.

The alignment film material storing portion 29 is formed such that at least a portion of the side surface thereof and the normal line form the angle of the minimum value θ3 from 70 degrees to 80 degrees. With the configuration that a lowest value of the minimum value θ3 within the above range is 70 degrees, the material for the array board side alignment film 11e is further surely stored in the alignment film material storing portion 29.

The minimum value θ2 of the angle formed by the side surface of the film forming area restricting portion 28 and the normal line is smaller than the minimum value θ3 of the angle formed by at least a portion of the side surface of the alignment film material storing portion 29 and the normal line. According to such a configuration, the material for the array board side alignment film 11e is more surely held by the side surface of the film forming area restricting portion 28 and the area where the array board side alignment film 11e is formed is surely restricted.

The film forming area restricting portion 28 is formed such that the minimum value θ2 of the angle formed by the side surface thereof and the normal line is 50 degrees or less. If the minimum value of the angle is greater than 50 degrees, the material for the array board side alignment film 11e is less likely to be held by the side surface of the film forming area restricting portion 28 in forming the array board side alignment film 113, and the spread of the material may not be restricted. On the other hand, as the angle formed by the side surface of the film forming area restricting portion 28 and the normal line is smaller, the material for the array board side alignment film 11e is likely to be held by the side surface of the film forming area restricting portion 28. Therefore, with the configuration that the film forming area restricting portion 28 is formed to have the angle of 50 degrees or less, the area where the array board side alignment film 11e is formed is surely restricted.

The alignment film material storing portion 29 is formed so that the minimum angle θ3 formed by the entire area of the side surface thereof and the normal line is greater than the angle θ1 formed by the holding portion of the side surface of the film forming area restricting portion 28 holding the material for the array board side alignment film 11e. According to such a configuration, the material for the array board side alignment film 11e is less likely to be held by the entire area of the side surface of the alignment film material storing portion 29 in forming the array board side alignment film 11e. Therefore, the material is smoothly stored in the alignment film material storing portion 29. Thus, the thickness of the array board side alignment film 11e is made uniform in the display area AA more preferably.

The liquid crystal panel (the display device) 11 according to this embodiment includes the array board 11b, the CF board (an opposed display component 11a, the liquid crystal layer (liquid crystals) 11c, and the sealing member 11j. The CF board 11a is attached to the array board 11b to be opposed to each other with a distance therebetween. The liquid crystal layer 11c is held between the array board 11b and the CF board 11a. The sealing member 11j is disposed to surround the liquid crystal layer 11c and between the array board 11b and the CF board 11a to seal the liquid crystal layer 11c. The film forming area restricting portion 28 is disposed closer to the display area AA than the sealing member 11j and to surround the entire periphery of the display area AA. According to such a liquid crystal panel 11, the material for the array board side alignment film 11e is stored in the alignment film material storing portion 29 included in the array board 11b so that the thick portion FP to be formed in the array board side alignment film 11e is less likely to be formed in the display area AA. Therefore, the thickness of the array board side alignment film 11e is uniform and the display quality of the display device is improved. The film forming area restricting portion 28 is disposed closer to the display area AA than the sealing member 11j and to surround the entire periphery of the display area AA and the film forming area restricting portion 28 restricts the area where the array board side alignment film 11e is formed. Therefore, the array board side alignment film 11e is less likely to be disposed to overlap the sealing member 11j. Accordingly, the sealing properties of the sealing member 11j are less likely to be adversely affected and moisture is less likely to enter the liquid crystal layer 11c from outside.

One of the array board 11b and the CF board 11a includes the TFTs (the display components) 17 on the liquid crystal layer 11c side to display images and the TFTs 17 include the semiconductor film 36 made of oxide semiconductors. According to such a configuration, images are displayed in the display area AA with the TFTs 17. The oxide semiconductors of the semiconductor film 36 included in the TFT 17 is likely to change its mechanical properties if exposed to moisture or water. However, as described before, the array board side alignment film 11e is less likely to overlap the sealing member 11j so that moisture is less likely to enter the liquid crystal layer 11c from outside. Therefore, the electrical properties of the oxide semiconductors are less likely to change and the properties of the TFTs 17 are less likely to be deteriorated.

The oxide semiconductors contain indium (In), gallium (Ga), zinc (Zn), and oxide (O). Accordingly, the oxide semiconductors containing indium (In), gallium (Ga), zinc (Zn), and oxide (O) are less likely to change its electrical properties and the properties of the TFTs 17 are less likely to be deteriorated.

The oxide semiconductors have crystalline qualities. Accordingly, the oxide semiconductors containing indium (In), gallium (Ga), zinc (Zn), and oxide (O) and having crystalline qualities are less likely to change its electrical properties and therefore, the properties of the TFTs 17 are less likely to be deteriorated.

Second Embodiment

A second embodiment of the present invention will be described with reference to FIGS. 12 to 14. According to the second embodiment, an alignment film material storing portion 129 has a plan view shape different from that of the first embodiment. The structures, operations, and effects similar to those of the first embodiment will not be described.

As illustrated in FIG. 13, the alignment film material storing portion 129 of this embodiment has a meandering plan view shape. Specifically, the alignment film material storing portion 129 includes parallel portions 31 and angled portions 32. The parallel portions 31 are parallel to a film forming area restricting portion 128 (an outer shape of the display area AA). The angled portions 32 are angled to a longitudinal extending direction of the film forming area restricting portion 128. The entire meandering plan view shape of the alignment film material storing portion 129 is configured by repeatedly alternately connecting the parallel portions 31 and the angled portions 32. The parallel portions 31 and the angled portions 32 form corner portions 33 at connection portions thereof. The angled portions 32 are perpendicular to the extending direction of the film forming area defining portion 129 and an angle formed by the angled portions 32 and the parallel portions 31 is substantially 90 degrees.

Figure 14:
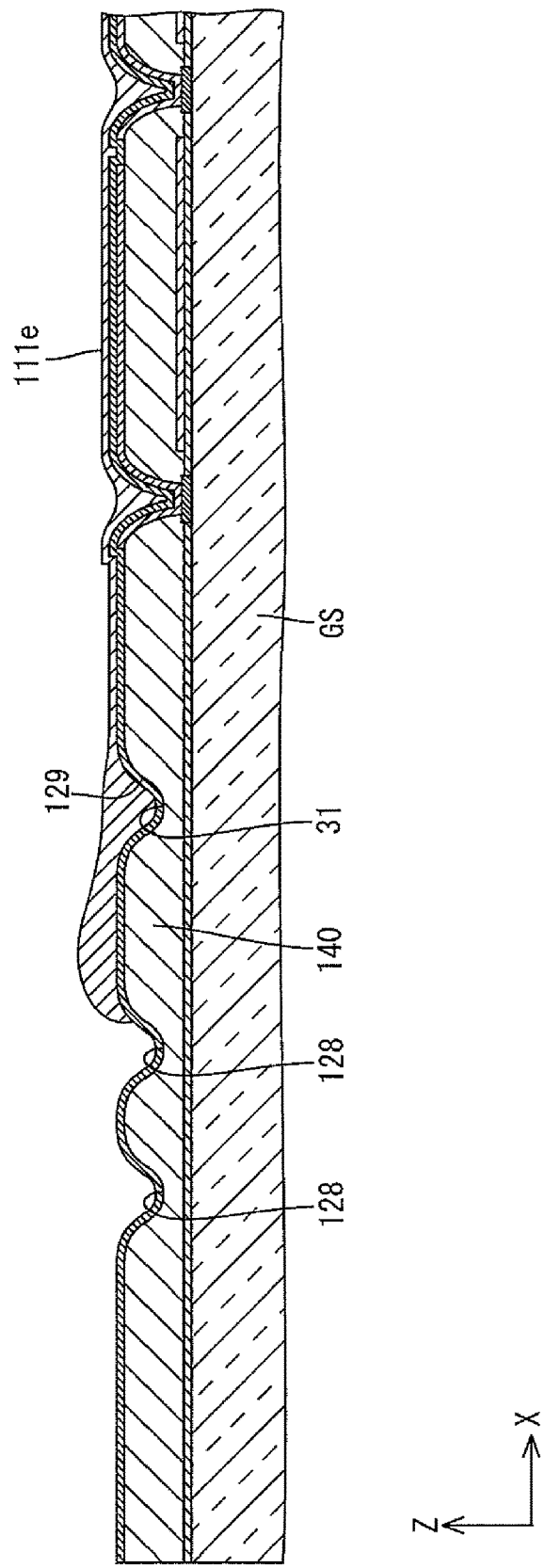
FIG. 14 is a cross-sectional view taken along line xiv-xiv in FIG. 13.
Figure 15:
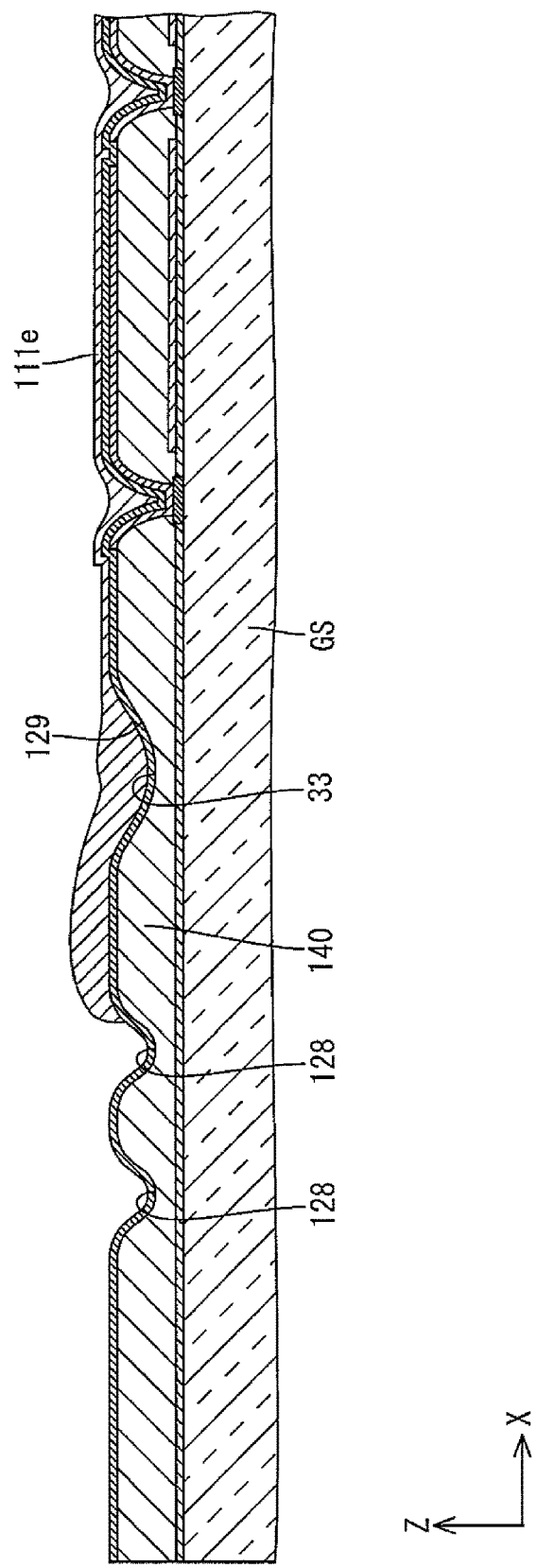
FIG. 15 is a cross-sectional view taken along line xv-xv in FIG. 13.

As illustrated in FIG. 14, the parallel portions 31 included in the alignment film material storing portion 129 have a width dimension and a depth dimension that are substantially same as a width dimension and a depth dimension of the film forming area restricting portion 128. Further, the parallel portions 31 have a cross sectional shape that is substantially same as that of the film forming area restricting portion 128. A minimum value of an angle formed by side surfaces of the parallel portions 31 and a normal line of the glass substrate GS is substantially same as that formed by the side surface of the film forming area restricting portion 128. A variation rate of the angle with respect to the width direction of the alignment film material storing portion 129 is substantially same as that of the film forming area restricting portion 128. The cross sectional shape of the angled portions 32 is substantially same as that of the parallel portions 31 and is not illustrated. On the other hand, as illustrated in FIG. 15, the corner portions 33 included in the alignment film material storing portion 129 have a depth dimension substantially same as that of the film forming area restricting portion 128 and a width direction greater than that of the film forming area restricting portion 128. Further, a minimum angle formed by the side surface of the corner portions 33 and the normal line of the glass substrate GS is greater than an angle formed by a holding portion of the side surface of the film forming area restricting portion 128 holding the material for an array board side alignment film 111e and the normal line of the glass substrate GS. Therefore, in forming the array board side alignment film 111e, the material for the array board side alignment film 111e does not flow directly to the parallel portions 32 and the angled portions 32 but flows into the alignment film material storing portion 129 through the side surfaces of the corner portions 33. After the alignment film material storing portion 129 is filled with the material, the material flows toward the film forming area restricting portion 128. Thus, the angle formed by the normal line and the parallel portions 31 and the angled portions 32 included in the alignment film material storing portion 129 excluding the corner portions 33 may be substantially same as the angle formed by the side surface of the film forming area restricting portion 128 and the normal line. Even with the above configuration, the material for the array board side alignment film 111e is stored in the alignment film material storing portion 129.

The alignment film material storing portion 129 including the corner portions 33 may be formed in the organic insulation film 140 by the photolithography method with patterning. With such a method, the amount of exposure light exposed to the organic insulation film 140 is same in a portion of the organic insulation film 140 where the alignment film material storing portion 129 is to be formed and a portion thereof where the film forming area restricting portion 128 is to be formed. Accordingly, the alignment film material storing portion 129 and the film forming area restricting portion 128 are easily formed.

As is described before, according to this embodiment, the alignment film material storing portion 129 has a plan view shape including the corner portions 33 hat are curved with respect to the normal line, and the minimum value of the angle formed by the side surface of the corner portions 33 and the normal line is greater than the angle formed by the normal line and the holding portion of the side surface of the film forming area restricting portion 128 holding the material for the array board side alignment film 111e. According to such a configuration, in forming the array board side alignment film 111e, the material for the array board side alignment film 111e is less likely to be held by the side surface of the corner portions 33 of the alignment film material storing portion 129 and the material is stored in the alignment film material storing portion 129. Accordingly, the angle formed by the normal line and the side surface of the portions of the alignment film material storing portion 129 excluding the corner portions 33 may be substantially same as the angle formed by the side surface of the film forming area restricting portion 128 and the normal line. Even with the above configuration, the material for the array board side alignment film 111e is stored in the alignment film material storing portion 129. The alignment film material storing portion 129 including the corner portions 33 may be formed in the organic insulation film 140 by the photolithography method with patterning. With such a method, the amount of exposure light exposed to the organic insulation film 140 is same in a portion of the organic insulation film 140 where the alignment film material storing portion 129 is to be formed and a portion thereof where the film forming area restricting portion 128 is to be formed. Accordingly, the alignment film material storing portion 129 and the film forming area restricting portion 128 are easily formed.

Third Embodiment

A third embodiment of the present invention will be described with reference to FIG. 16. The third embodiment differs from the first embodiment in that a CF board 211a includes a film forming area restricting portion 42 and an alignment film material storing portion 43. The configurations, operations, and effects similar to those in the first embodiment will not be described.

Figure 16:
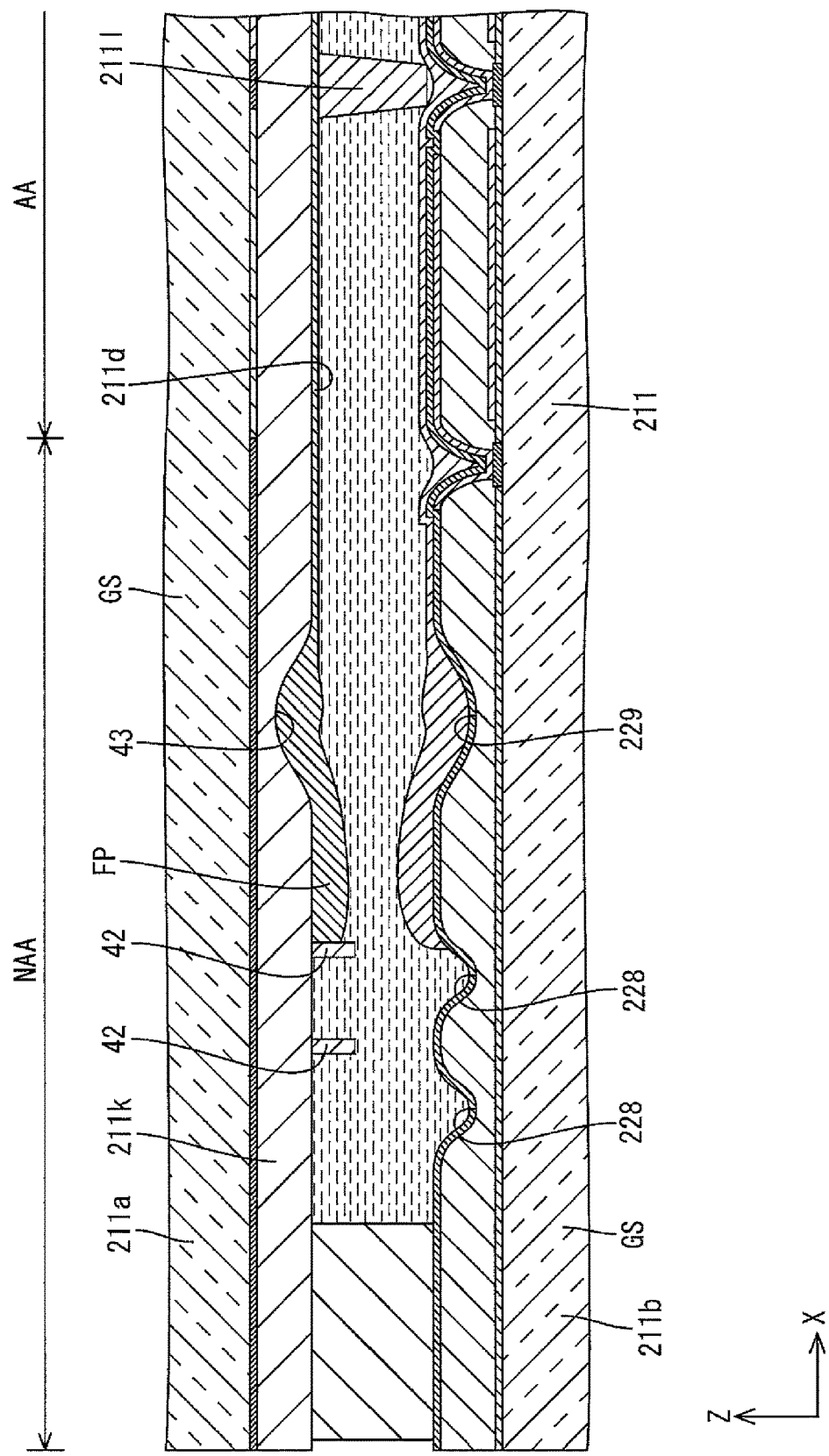
FIG. 16 is a cross-sectional view illustrating a cross-sectional configuration of an edge portion of a liquid crystal panel according to a third embodiment of the present invention.

As illustrated in FIG. 16, the CF board 211 according to this embodiment includes the film forming area restricting portion 42 and the alignment film material storing portion 43 in the non-display area NAA. The film forming area restricting portion 42 defines an area where a CF board side alignment film 211d is formed and the alignment film material storing portion 43 stores the material for the CF board side alignment film 211d. The film forming area restricting portion 42 projects from a surface of an OC layer 211k that is an insulation film included in the CF board 211a and has a substantially prism cross sectional shape. In forming the CF board side alignment film 211d, the material for the CF board side alignment film 211d flows and spreads outwardly from the display area AA over the surface of the OC layer 211k. The film forming area restricting portion 42 stops the flow of the material and the material for the CF board side alignment film 211*d* is less likely to spread outwardly from the film forming area restricting portion 42. The film forming area restricting portion 42 is made of a material same as a spacer 2111 included in the CF board 211*a* and is formed with patterning simultaneously in the same process of forming the spacer 2111 by the photolithography method with patterning. Two film forming area restricting portions 42 include an inner peripheral side film forming area defining portion and an outer peripheral side film forming area defining portion that are disposed parallel to each other with a certain distance therebetween. As described before, the film forming area restricting portions 42 are disposed in the non-display area NAA of the CF board 211*a* and project from the surface of the OC layer 211*k* included in the insulation film so that the area of the CF board side alignment film 211*d* is defined. The plan view shape and the plan view area of the film forming area restricting portion 42 are similar to those of the film forming area restricting portion 228 included in the array board 211*b*.

On the other hand, the alignment film material storing portion 43 is formed by partially recessing the OC layer 211*k* and is a groove having a substantially arc curved cross sectional shape. The alignment film material storing portion 43 is formed such that the minimum value of the angle formed by the side surface thereof and the normal line of the glass substrate GS is substantially same as the minimum value of the angle formed by the side surface of the alignment film material storing portion 229 of the array board 211*b* and the normal line. Therefore, in forming the CF board side alignment film 211*d*, the material for the CF board side alignment film 211*d* spreading outwardly from the display area AA over the surface of the OC layer 211*k* is stored in the alignment film material storing portion 43. Accordingly, in forming the CF board side alignment film 211*d*, the material for the CF board side alignment film 211*d* is held by the side surface of the film forming area restricting portion 42 and returned to the display area AA side. Accordingly, even if the thick portion FP is generated in an outer peripheral edge portion of the CF board side alignment film 211*d*, the area of the thick portion FP is reduced by the amount of the material for the CF board side alignment film 211*d* stored in the alignment film material storing portion 43. Thus, the thick portion FP is less likely to be formed in the display area AA and the thickness of the CF board side alignment film 211*d* is uniform in the display area AA and the display quality of the liquid crystal panel 211 is improved. As is described before, the alignment film material storing portion 43 is disposed closer to the display area AA than the film forming area restricting portion 42 in the non-display area NAA of the CF board 211*a*, and the alignment film material storing portion 43 is formed by partially recessing the surface of the OC layer 211*k* included in the insulation film so as to store the material for the CF board side alignment film 211*d* therein. The plan view shape and the plan view area of the alignment film material storing portion 43 are similar to those of the alignment film material storing portion 229 included in the array board 211*b*.

As is described before, the CF board (the display component) 211*a* includes the glass substrate GS, the OC layer 211*k*, the CF board side alignment film (the alignment film) 211*d*, the film forming area restricting portion 42, and the alignment film material storing portion 43. The glass substrate GS includes the display area AA and the non-display area NAA that surrounds the display area AA. The OC layer 211*k* is disposed over a range of the display area AA and the non-display area NAA and included in the insulation film disposed on the glass substrate GS. The CF board side alignment film 211*d* is disposed over a range of the display area AA and the non-display area NAA and over a surface of the OC layer 211*k* included in the insulation film. The film forming area restricting portion 42 is disposed in the non-display area NAA and projects from the surface of the OC layer 211*k* included in the insulation film. The alignment film material storing portion 43 is disposed closer to the display area AA than the film forming area restricting portion 42 in the non-display area NAA and formed by partially recessing the OC layer 211*k* included in the insulation film.

In forming the CF board side alignment film 211*d*, a material that is in a liquid state and used for the CF board side alignment film 211*d* is supplied to the display area AA of the glass substrate GS. The material flows and spreads over the surface of the OC layer 211*k* included in the insulation film disposed on the glass substrate GS so that the CF board side alignment film 211*d* is formed over the surface of the OC layer 211*k* included in the insulation film. The CF board side alignment film 211*d* is disposed over a range of the display area AA and the non-display area so that the CF board side alignment film 211*d* is surely disposed over the display area AA.

The film forming area restricting portion 42 projects from the surface of the OC layer 211*k* included in the insulation film and disposed in the non-display area NAA. The material for the CF board side alignment film 211*d* flows and spreads from the display area AA toward the non-display area NAA in forming the CF board side alignment film 211*d*. The film forming area restricting portion 42 stops the flow of the material for the CF board side alignment film 211*d* and the material is less likely to spread outwardly from the film forming area restricting portion 42. Accordingly, the area where the CF board side alignment film 211*d* is formed is restricted. The material for the CF board side alignment film 211*d* spreads over the surface of the OC layer 211*k* included in the insulation film in forming the film, and the film forming area restricting portion 42, which projects from the surface of the OC layer 211*k* included in the insulation film, stops the spread of the material further from the film forming area restricting portion 42. The material stopped by the film forming area restricting portion 42 is returned toward the display area AA side and the thick portion FP is generated in the CF board side alignment film 211*d*. The thick portion FP ranges from the film forming area restricting portion 42. If the CF board side alignment film 211*d* includes the thick portion FP in the display area AA, the thickness of the CF board side alignment film 211*d* is uneven in the display area AA. If the width of the non-display area NAA is decreased to reduce the frame size, the thick portion FP is likely to be disposed in the display area AA.

The alignment film material storing portion 43 is formed by partially recessing the OC layer 211*k* included in the insulation film and is closer to the display area AA than the film forming area restricting portion 42 in the non-display area NAA. Accordingly, the material for the CF board side alignment film 211*d* is stored in the alignment film material storing portion 43. If the material for the CF board side alignment film 211*d* is stopped by the film forming area restricting portion 42 and returned toward the display area AA and the thick portion FP may be generated in the CF board side alignment film 211*d*, the area where the thick portion FP is generated is reduced by the amount of the material for the CF board side alignment film 211*d* stored in the alignment film material storing portion 43. Therefore, the thick portion FP is less likely to be generated in the display area AA. Thus, the thickness of the CF board side alignment film 211d is uniform in the display area AA and therefore, the display quality of display with the CF board 211a is improved. Particularly, it is effective to reduce the frame size.

Fourth Embodiment

A fourth embodiment of the present invention will be described with reference to FIG. 17. In the fourth embodiment, the number of film forming area restricting portions 328 and alignment film material storing portions 329 is altered from that in the first embodiment. Configurations, operations, and effects similar to those in the first embodiment will not be described.

Figure 17:
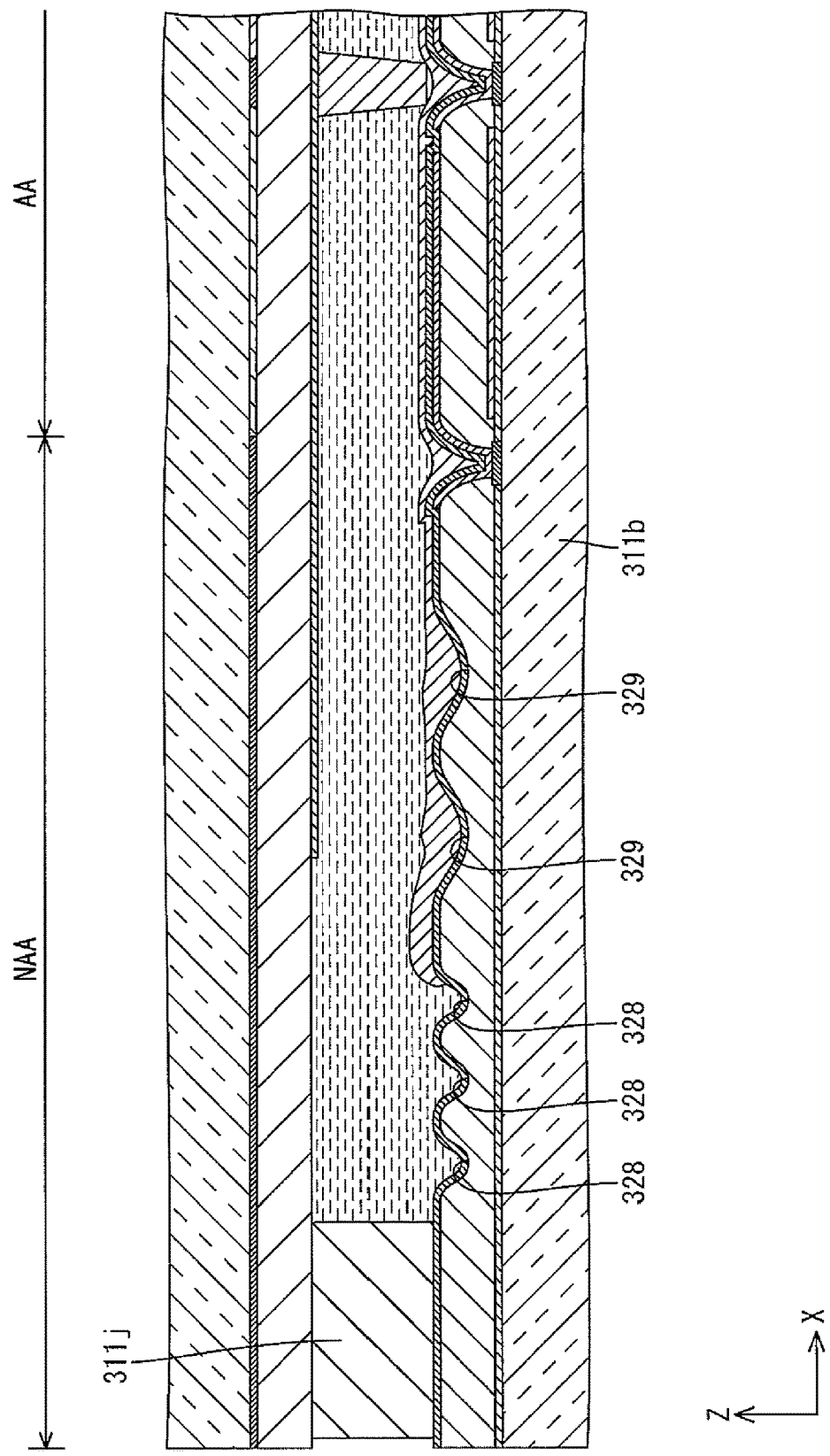
FIG. 17 is a cross-sectional view illustrating a cross-sectional configuration of an edge portion of a liquid crystal panel according to a fourth embodiment of the present invention.

As illustrated in FIG. 17, three film forming area restricting portions 328 are provided parallel to each other between a sealing member 311j and an alignment film material storing portion 329. Two alignment film material storing portions 329 are disposed parallel to each other between the film forming area restricting portion 328 and the display area AA. An inner peripheral side alignment film material storing portion 329 has a plan view shape slightly smaller than that of an outer peripheral side alignment film material storing portion 329.

Fifth Embodiment

A fifth embodiment of the present invention will be described with reference to FIG. 18. In the fifth embodiment, an alignment film material storing portion 429 has a plan view shape different from that of the first embodiment. Configurations, operations, and effects similar to those in the first embodiment will not be described.

Figure 18:
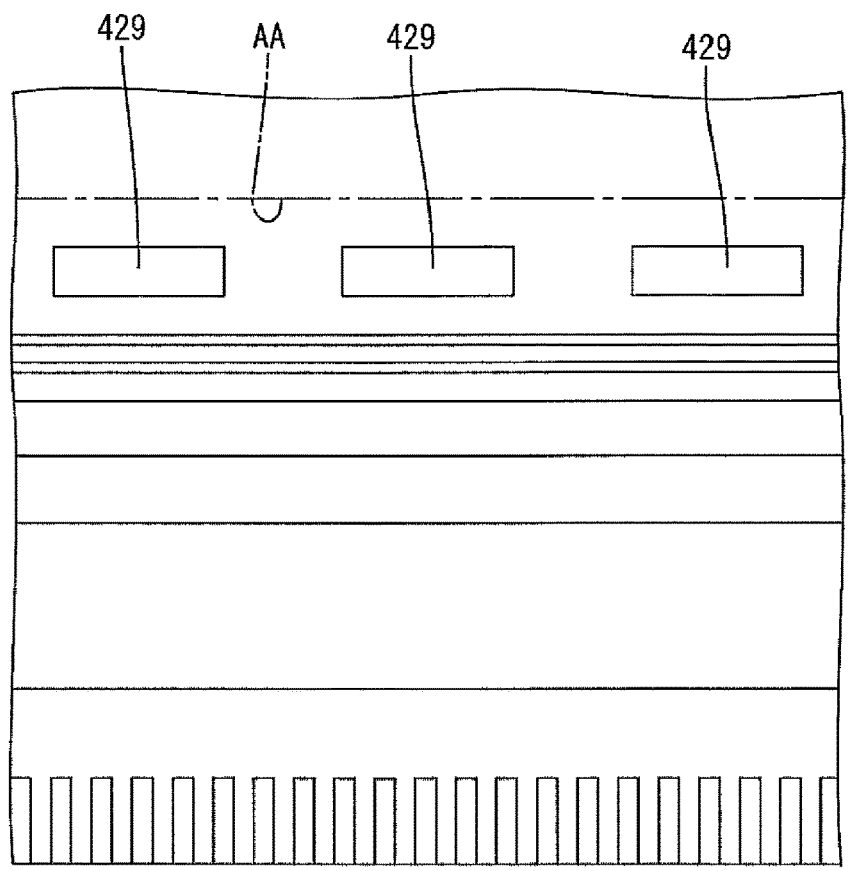
FIG. 18 is a plan view illustrating a part of an array board according to a fifth embodiment of the present invention.

As illustrated in FIG. 18, the alignment film material storing portion 429 of this embodiment has a plan view rectangular recessed shape and multiple alignment film material storing portions 29 are disposed at intervals along an outer shape of the display area AA. The alignment film material storing portions 429 are arranged to surround the display area AA over an entire periphery of the display area AA. With such a configuration, the material for the array board side alignment film is stored in the alignment film material storing portions 429 in forming the array board side alignment film so that the thickness of the array board side alignment film is effectively uniform in the display area AA.

Sixth Embodiment

A sixth embodiment of the present invention will be described with reference to FIG. 19. In the sixth embodiment, a film forming area restricting portion 528 and an alignment film material storing portion 529 have a depth dimension different from that in the first embodiment. Configurations, operations, and effects similar to those of the first embodiment will not be described.

Figure 19:
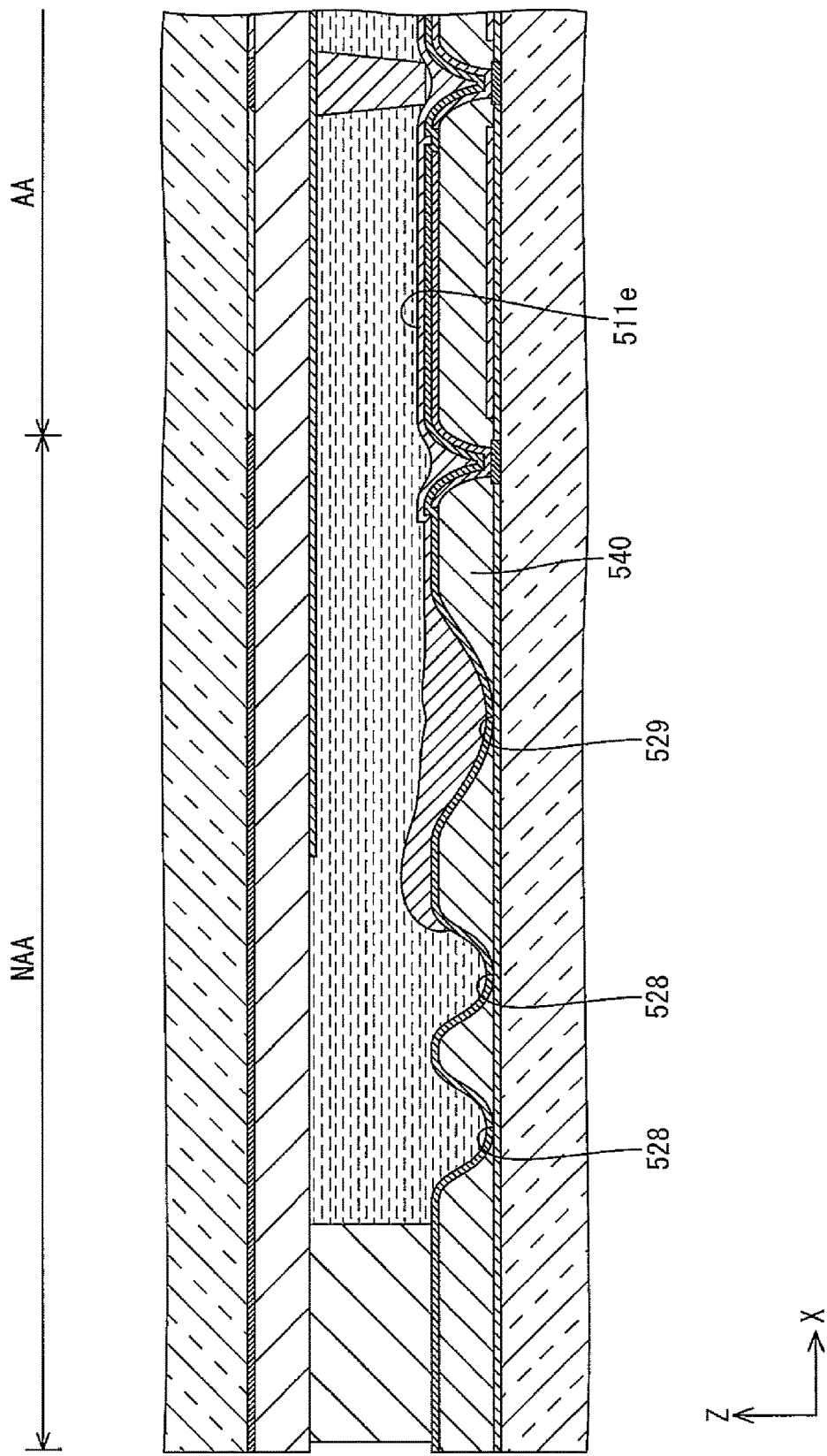
FIG. 19 is a cross-sectional view illustrating a cross-sectional configuration of an edge portion of a liquid crystal panel according to a sixth embodiment of the present invention.

As illustrated in FIG. 19, the film forming area restricting portion 528 and the alignment film material storing portion 529 have a depth dimension that is through the thickness of an organic insulation film 540. Namely, the film forming area restricting portion 528 and the alignment film material storing portion 529 have a depth dimension that is substantially same as the film thickness of the organic insulation film 540. According to such a configuration, the alignment film material storing portion 529 stores a greater amount of the material for an array board side alignment film 511e.

Therefore, a uniform thickness of the array board side alignment film 511e in the display area AA is preferably achieved.

Seventh Embodiment

A seventh embodiment of the present invention will be described with reference to FIG. 20. In the seventh embodiment, a film forming area restricting portion 628 and an alignment film material storing portion 629 have a depth dimension different from that of the sixth embodiment. Configurations, operations, and effects similar to those of the sixth embodiment will not be described.

Figure 20:
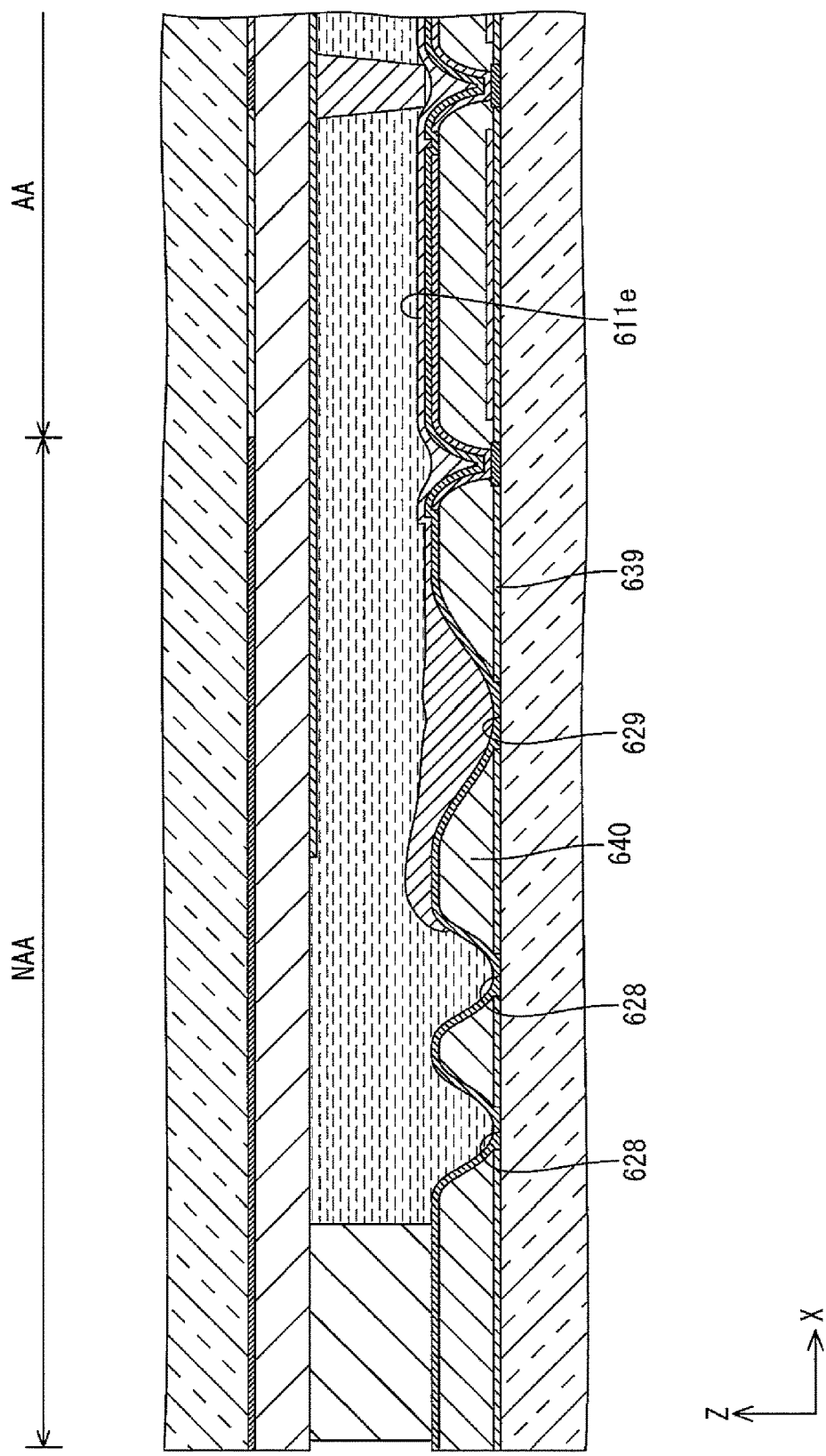
FIG. 20 is a cross-sectional view illustrating a cross-sectional configuration of an edge portion of a liquid crystal panel according to a seventh embodiment of the present invention.

As illustrated in FIG. 20, the film forming area restricting portion 628 and the alignment film material storing portion 629 of this embodiment have a depth dimension that is through an organic insulation film 640 and a first interlayer insulation film 639. Namely, the film forming area restricting portion 628 and the alignment film material storing portion 629 have the depth dimension that is substantially equal to a total of the thickness of the organic insulation film 640 and the thickness of the first interlayer insulation film 639. According to such a configuration, the alignment film material storing portion 629 stores a much greater amount of the material for array board side alignment film 611e. Therefore, a uniform thickness of the array board side alignment film 611e in the display area AA is preferably achieved.

Eighth Embodiment

An eight embodiment of the present invention will be described with reference to FIG. 21. In the eighth embodiment, a method of forming an alignment film material storing portion 729 differs from that of the first embodiment. Configurations, operations, and effects similar to those of the first embodiment will not be described.

Figure 21:
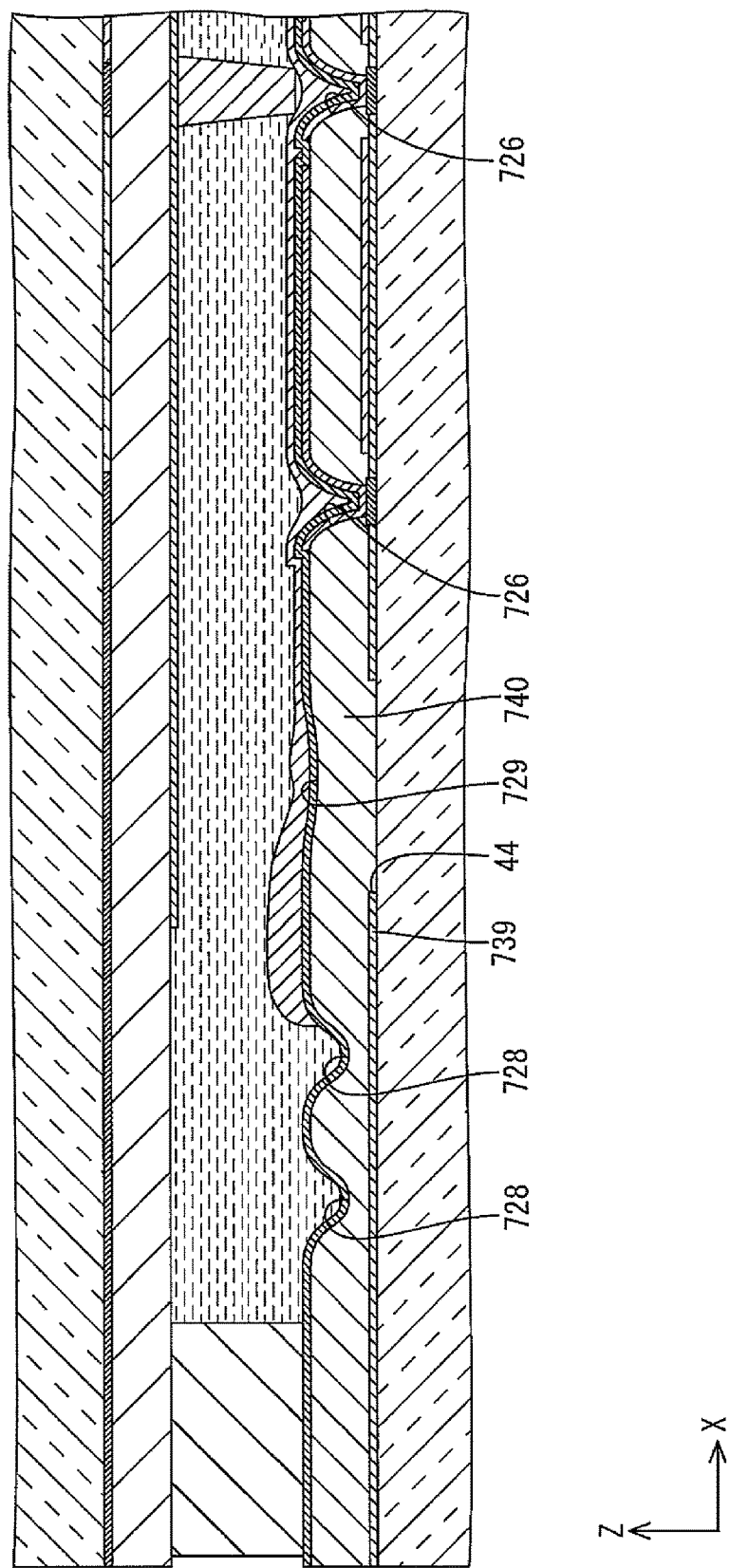
FIG. 21 is a cross-sectional view illustrating a cross-sectional configuration of an edge portion of a liquid crystal panel according to an eighth embodiment of the present invention.

As illustrated in FIG. 21, a first interlayer insulation film 739 has a hole 44 and a portion of an organic insulation film 740 above the hole 44 is recessed downward. The recessed portion constitutes the alignment film material storing portion 729. Namely, the organic insulation film 740 has a substantially same thickness at a portion where the alignment film material storing portion 729 is formed and at other portions (except for portions where contact holes 726 and film forming area restricting portions 728 are formed). According to such a configuration, a halftone mask is not necessary to be used as a photomask in forming the organic insulation film 740 by the photolithography method with patterning, and this reduces a manufacturing cost.

Ninth Embodiment

A ninth embodiment of the present invention will be described. In the ninth embodiment, a photomask used in exposing an organic insulation film 840 differs from that used in the first embodiment. Configurations, operations, and effects similar to those of the first embodiment will not be described.

Figure 22:
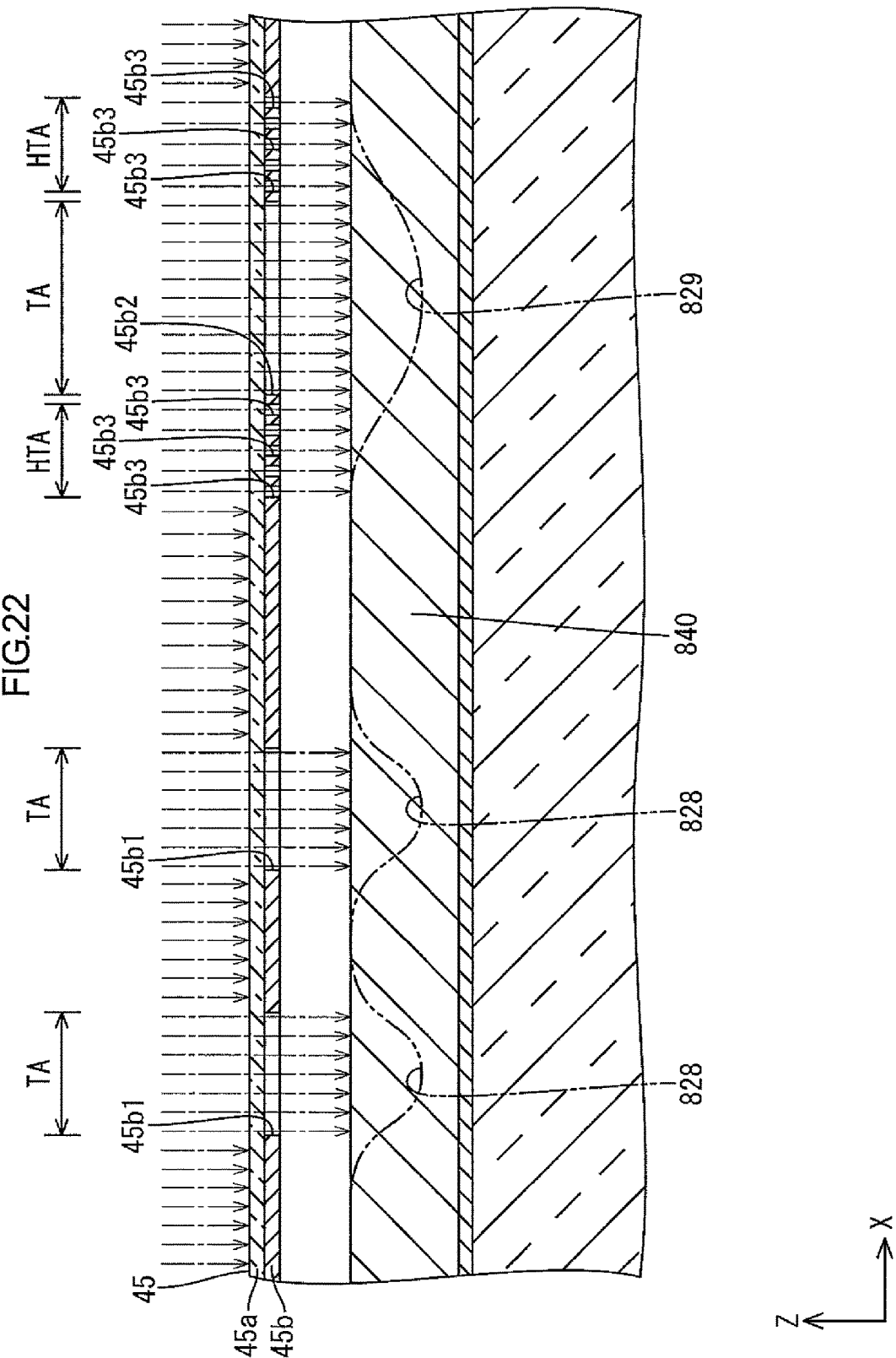
FIG. 22 is a cross-sectional view illustrating a process of exposing an organic insulating film using a half tone mask in a process of manufacturing an array board according to a ninth embodiment of the present invention.

In this embodiment, a gray tone mask 45 is used as a photomask when the organic insulation film 840 is formed by the photolithography method with patterning, a gray tone mask 45 is used as the photomask. As illustrated in FIG. 22, the gray tone mask 45 includes a transparent glass substrate 45a and a light blocking film 45b that is formed on a plate surface of the glass substrate 45a and blocks exposure light from a light source. The light blocking film 45b includes holes 45*b*1, 45*b*2 that enable resolution higher than resolution of the exposing device and slits 45*b*3 that enables the resolution lower than that of the exposing device. The holes 45*b*1, 45*b*2 are formed corresponding to portions of the organic insulation film 840 where the film forming area restricting portions 828 and the alignment film material storing portion 829 are to be formed. Such holes are also formed in the light blocking film 45*b* corresponding to portions of the organic insulation film 840 where the contact holes are to be formed. The holes 45*b*1, 45*b*2 correspond to the transmission area TA where the transmittance of exposure light is substantially 100%. The slits 45*b*3 are formed to sandwich the hole for storing portion 45*b*2 out of the holes 45*b*1 and 45*b*2. The slits 45*b*3 are disposed on an inner peripheral side with respect to the hole for storing portion 45*b*2 and the slits 45*b*3 are disposed on an outer peripheral side with respect to the hole for storing portions 45*b*2. The slits 45*b*3 correspond to the semi-transmission area HTA where the transmittance of exposure light is substantially from 10% to 70%.

The organic insulation film 840 is developed after irradiated with the exposure light from the light source through the above structured gray tone mask 45. Contact holes, the film forming area restricting portion 828, and a middle portion of the alignment film material storing portion 829 are formed in respective portions of the organic insulation film 840 overlapping the transmission area TA in a plan view. Two edge portions of the alignment film material storing portion 829 are formed in respective portions of the organic insulation film 840 overlapping the semi-transmission area HTA in a plan view. According to such a configuration, the side surface of the alignment film material storing portion 829 is formed to be a slope that is more gentle than that of the film forming area restricting portion 828.

Tenth Embodiment

A tenth embodiment of the present invention will be described with reference to FIG. 23. In the tenth embodiment, an alignment film material storing portion 929 has a plan view shape different from that of the second embodiment. Configurations, operations, and effects similar to those of the second embodiment will not be described.

Figure 23:
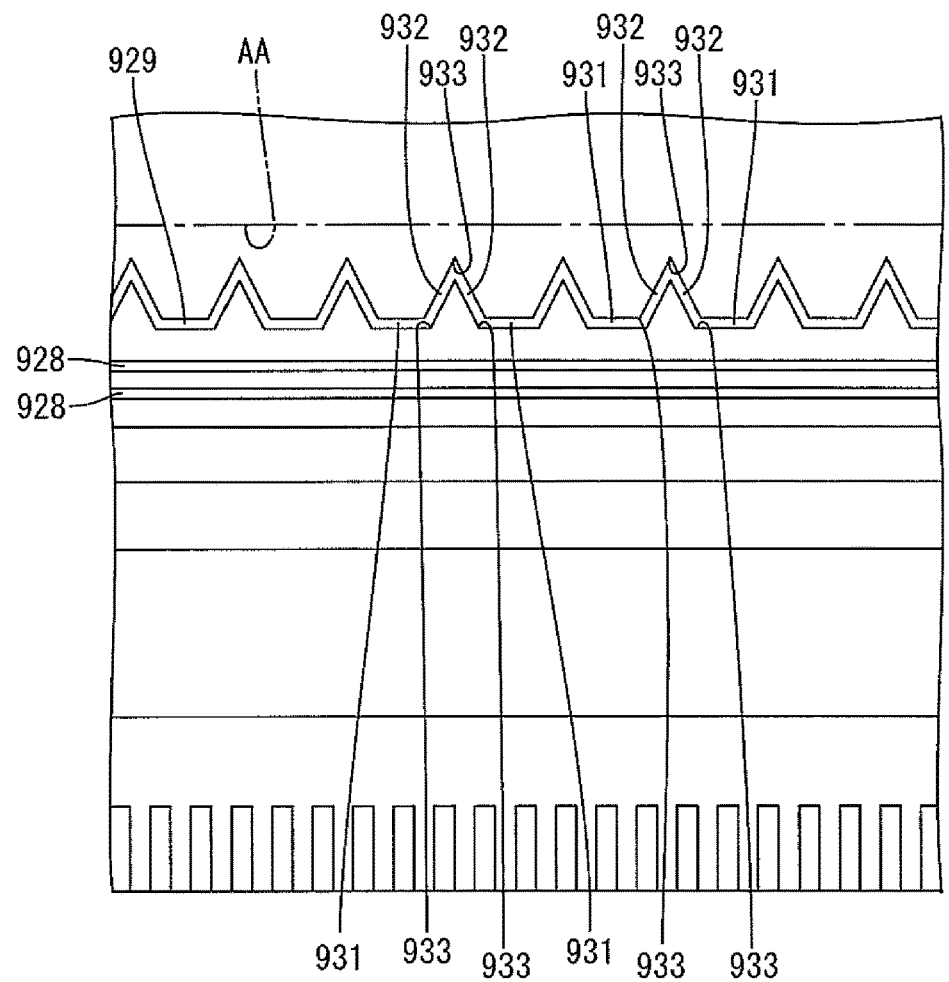
FIG. 23 is a plan view of a part of an array board according to a tenth embodiment of the present invention.

As illustrated in FIG. 23, the alignment film material storing portion 929 includes parallel portions 931 that are parallel to a film forming area restricting portion 928 (the outer shape of the display area AA), and angled portions 932 that are angled at an obtuse angle with respect to the film forming area restricting portion 928. Two ends of the parallel portion 931 are continuous to respective one ends of different angled portions 932 and another ends of the angled portions 932 are continuous to another angled portions 932. The other ends of the angled portions 932 are opposite ends from the one ends continuous to the parallel portion 931. The parallel portion 931 and the angled portion 932 form a corner portion 933 having an acute angle at the connection portion thereof. The connected angled portions 932 form the corner portion 933 having an obtuse angle at the connection portion thereof. With such a configuration, the material for the array board side alignment film flows via each corner portion 933 into the alignment film material storing portion 929 similarly to the second embodiment.

Eleventh Embodiment

An eleventh embodiment of the present invention will be described with reference to FIG. 24. In the eleventh embodiment, an alignment film material storing portion 1029 has a plan view shape different from that of the second embodiment. Configurations, operations, and effects similar to those of the first embodiment will not be described.

Figure 24:
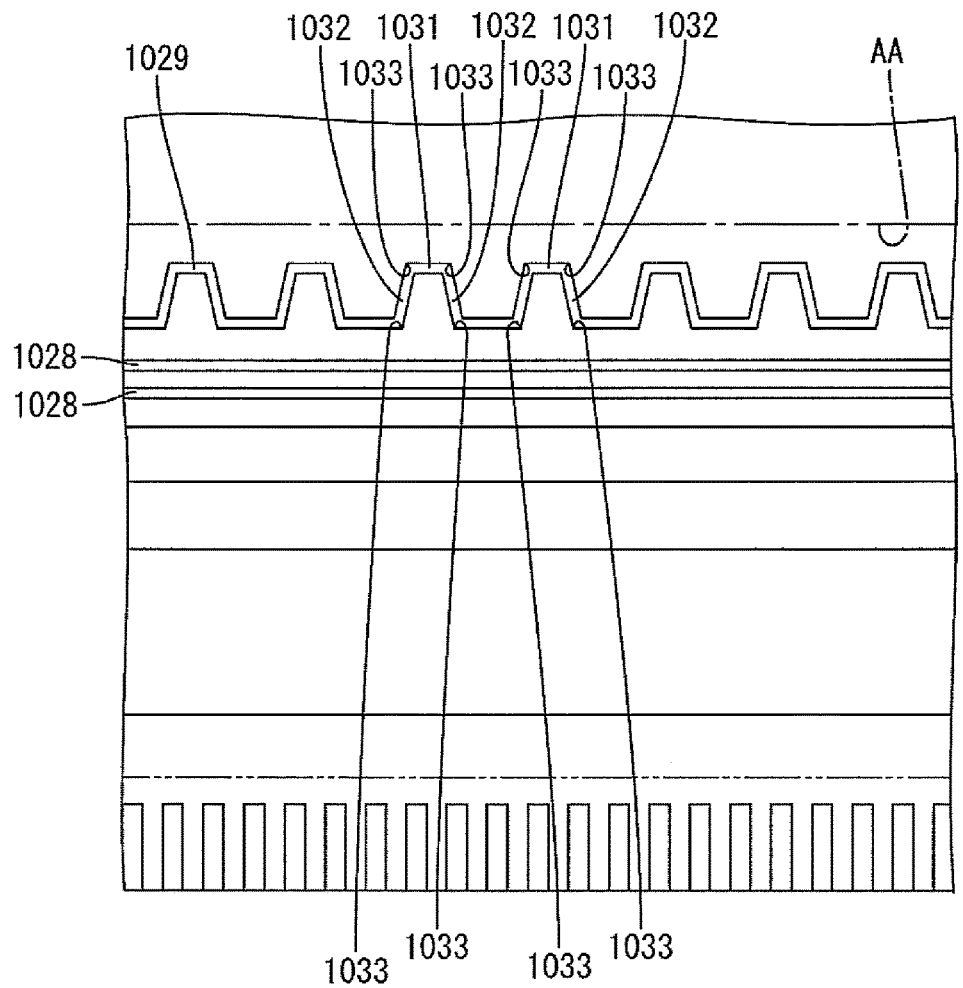
FIG. 24 is a plan view of a part of an array board according to an eleventh embodiment of the present invention.

As illustrated in FIG. 24, the alignment film material storing portion 1029 of this embodiment includes parallel portions 1031 that are parallel to a film forming area restricting portion 1028 (the outer shape of the display area AA), and angled portions 1032 that are angled at an obtuse angle with respect to the film forming area restricting portion 1028. The entire meandering plan view shape of the alignment film material storing portion 1029 is configured by repeatedly connecting the parallel portions 1031 and the angled portions 1032 alternately. The parallel portions 1031 and the angled portions 1032 form corner portions 1033 at connection portions thereof. With such a configuration, the material for the array board side alignment film flows via each corner portion 1033 into the alignment film material storing portion 1029 similarly to the second embodiment.

Twelfth Embodiment

A twelfth embodiment of the present invention will be described with reference to FIG. 25. In the twelfth embodiment, a method of forming a film forming area restricting portion 1142 is different from that in the third embodiment. Configurations, operations, and effects similar to those of the third embodiment will not be described.

Figure 25:
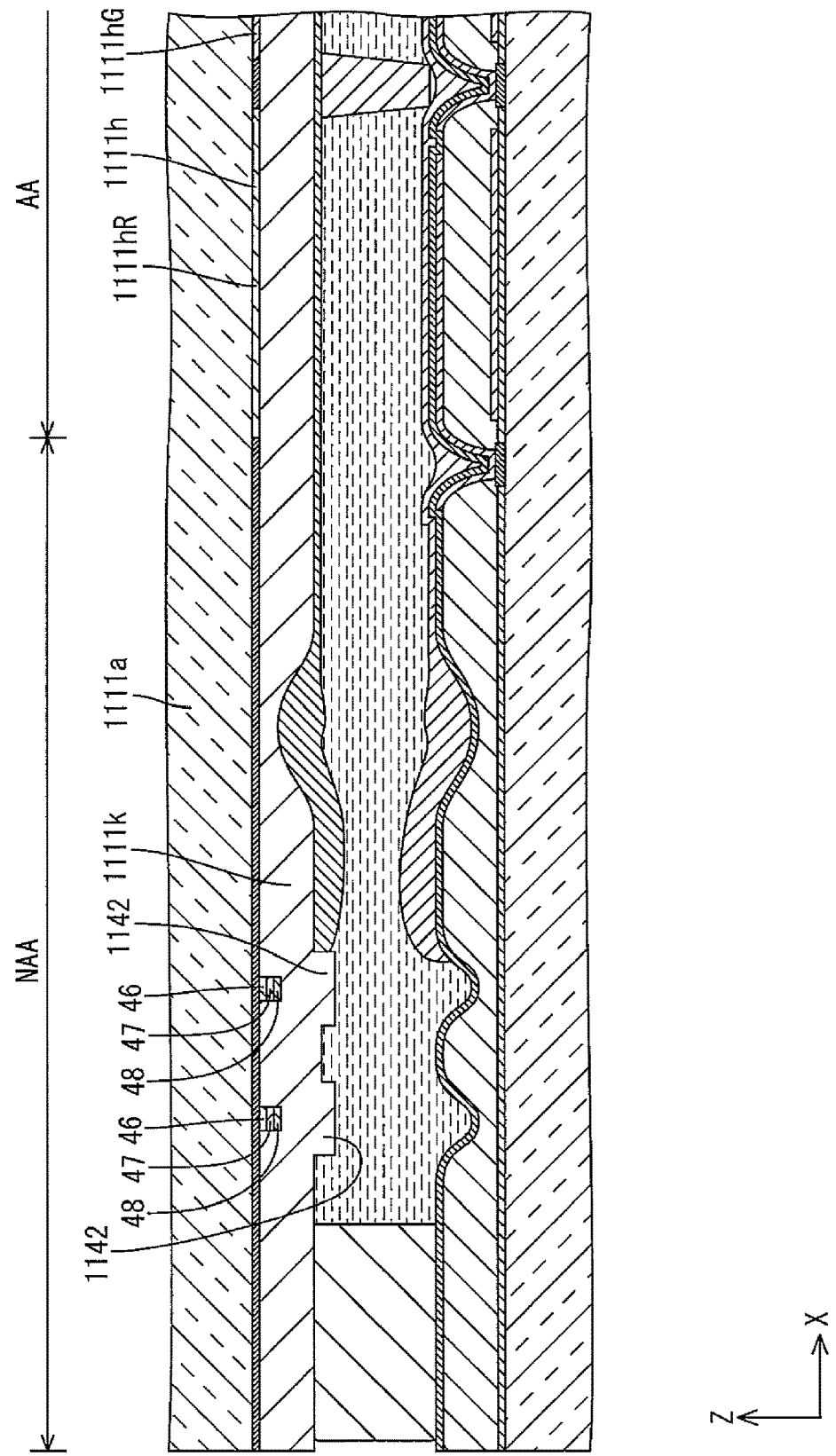
FIG. 25 is a cross-sectional view illustrating a cross-sectional configuration of an edge portion of a liquid crystal panel according to a twelfth embodiment of the present invention.

As illustrated in FIG. 25, in the non-display area NAA, a CF board 1111*a* of this embodiment includes extra layered portions 46-48 in a portion thereof where a film forming area restricting portion 1142 is to be formed. The extra layered portions 46-48 are made of the same material as a color portion 1111*h*R, 1111*h*G of a color filter 1111*h*. Accordingly, an OC layer 1111*k* disposed on the extra layered portions is partially projected and projected portions form the film forming area restricting portions 1142. A blue color portion is not illustrated in the drawing. The extra layered portions 46-48 include a first extra layered portion 46 that is made of the same material as the red color portion 1111*h*R, a second extra layered portion 47 that is made of the same material as the green color portion 1111*h*G, and a third extra layered portion 47 that is made of the same material as the blue color portion (not illustrated). The first extra layered portion 46 has a thickness substantially same as that of the red color portion 1111*h*R, the second extra layered portion 47 has a thickness substantially same as that of the green color portion 1111*h*G, and the third extra layered portion 48 has a thickness substantially same as that of the blue color portion. Thus, a half tone mask or a gray tone mask is not necessary to be used as a photomask when the color portions 1111*h*R, 1111*h*G and the extra layered portions 46-48 are formed by the photolithography method with patterning.

Thirteenth Embodiment

A thirteenth embodiment of the present invention will be described with reference to FIG. 26. In the thirteenth embodiment, a film forming area restricting portion 1242 has a configuration different from that of the third embodiment. Configurations, operations, and effects similar to those of the third embodiment will not be described.

As illustrated in FIG. 26, the film forming area restricting portion 1242 of this embodiment is formed by partially recessing an OC layer 1211*k* included in the CF board 1211*a* and is a groove having a substantially arc (curved) cross sectional shape. Namely, the film forming area restricting portion 1242 has a cross sectional shape similar to that of a film forming area restricting portion 1228 included in an array board 1211b. An angle formed by a side surface of the film forming area restricting portion 1242 and the normal line of the glass substrate GS is same as that formed by a side surface of the film forming area restricting portion 1228 and the normal line.

Other Embodiments

The present invention is not limited to the embodiments explained in the above description with reference to the drawings. The following embodiments may be included in the technical scope of the present invention, for example.

(1) In each of the embodiments, the width dimension of the alignment film material storing portion is greater than that of the film forming area restricting portion. The width dimension of the alignment film material storing portion may be equal to or smaller than that of the film forming area restricting portion.

(2) In each of the embodiments, the depth dimension of the alignment film material storing portion is equal to that of the film forming area restricting portion. The depth dimension of the alignment film material storing portion may be greater than or smaller than that of the film forming area restricting portion.

(3) In each of the embodiments, the alignment film material storing portion and the film forming area restricting portion are disposed to surround the display area. The alignment film material storing portion and the film forming area restricting portion may be selectively disposed along one or some of the four sides constituting the display area AA.

(4) Other than each of the embodiments, the specific angle formed by the side surface of the alignment film material storing portion and the normal line of the glass substrate and the variation rate of the angle may be altered as appropriate according to properties of the material used for the alignment film (the array board side alignment film, CF board side alignment film). Similarly, the specific angle formed by the side surface of the film forming area restricting portion and the normal line of the glass substrate and the variation rate of the angle may be altered as appropriate according to properties of the material used for the alignment film.

(5) Other than each of the embodiments, the number of the alignment film material storing portions and the film forming area restricting portions may be altered as appropriate. For example, the number of the alignment film material storing portions may be same as the number of the film forming area restricting portions. The number of the alignment film material storing portions may be smaller than that of the film forming area restricting portions. The number of the film forming area restricting portions may be one or four or more, or the number of the alignment film material storing portions may be three or more.

(6) In each of the embodiments, the positive type photosensitive resin material is used as a material for the organic insulation film. Exposed portions of the positive type photosensitive resin material are removed by development. A negative type photosensitive resin material may be used as the material for the organic insulation film. Non-exposed portions of the negative type photosensitive resin material are removed by development.

(7) In each of the embodiments, the organic insulation film included in the array board and the OC layer included in the CF board are made of photosensitive resin material. Non-photosensitive resin material may be used as a material for the organic insulation film and the OC layer.

(8) Other than the second, tenth, and eleventh embodiments, the plan-view shape of the alignment film material storing portion may be altered as appropriate.

(9) In the fifth embodiment, the alignment film material storing portions that are disposed along the outer shape of the display area have substantially the same plan view shape. The alignment film material storing portions disposed along the outer shape of the display area may have different plan view shapes.

(10) In the twelfth embodiment, the extra layered portions that are made of the same material as the three color portions of the color filter are disposed in the portion where the film forming area restricting portion is to be formed. The extra layered portions may include two extra layered portions that are made of the same material as the two of the three color portions. The extra layered portion may be a single layer structure including only one extra layered portion that is made of the same material as one of the three color portions.

(11) In the twelfth embodiment, the extra layered portions made of the same material as that of the color portions of the color filter are disposed in the portion where the film forming area restricting portion is to be formed. The light blocking portion may be partially thickened (projected) in the portion where the film forming area restricting portion is to be formed. Thus, the film forming area restricting portion may be formed on the OC layer.

(12) The alignment film material storing portion and the film forming area restricting portion on the CF board side according to the thirteenth embodiment may have configurations of the alignment film material storing portion and the film forming area restricting portion on the array board side according to the second, fourth to eleventh embodiments.

(13) The configurations of the second, fourth to eleventh embodiments may be combined as appropriate.

(14) In each of the embodiments, the ink jet device is used to form the array board side alignment film and the CF board side alignment film. A screen print device or a flexographic print device may be used.

(15) In each of the embodiments, the array board side alignment film and the CF board side alignment film are made of a photo alignment material and are photo alignment films that are subjected to an alignment process by irradiation of ultra violet rays. An array board side alignment film and a CF board side alignment film that are subjected to the alignment process by rubbing may be included in the scope of the present invention.

(16) In each of the embodiments, the alignment film is made of polyimide. Liquid crystal alignment materials other than polyimide may be used as the material for the alignment film.

(17) In each of the embodiments, the CF board includes the spacers (the photo spacers) formed by the photolithography method with patterning. Instead of such spacers, spherical spacers (spacer beads) may be dispersed within the display area.

(18) In each of the embodiments, the array board and the CF board constituting the liquid crystal panel include glass substrates, respectively. Instead of the glass substrates, resin substrates (plastic substrates) made of substantially transparent synthetic resin may be used.

(19) In each of the embodiments, the first metal film and the second metal film are formed from a multilayer film of titanium (Ti) and copper (Cu). However, titanium may be replaced by molybdenum (Mo), molybdenum nitride (MoN), titanium nitride (TiN), tungsten (W), niobium (Nb), molybdenum-titanium alloy (MoTi), or molybdenum-tungsten alloy (MoW). Alternatively, a single-layer metal film of titanium, copper, or aluminum may be used.

(20) In each of the above embodiments, the liquid crystal panel includes the FFS mode as an operation mode. However, a liquid crystal panel including the IPS (In-Plane Switching) mode or the VA (Vertical Alignment) mode as an operation mode may be included in the scope of the present invention. Particularly, in the liquid crystal panel including the VA mode as the operation mode, counter electrodes may be formed on the CF board instead of the array board and the OC layer may not be provided.

(21) In each of the embodiments, In—Ga—Zn—O semiconductor is used as an oxide semiconductor for the channel included in the TFT. Other oxide semiconductors may be used. For example, Zn—O semiconductor (ZnO), In—Zn—O semiconductor (IZO: registered trademark), Zn—Ti—O semiconductor (ZTO), Cd—Ge—O semiconductor, Cd—Pb—O semiconductor, CdO (cadmium oxide), Mg—Zn—O semiconductor, In—Sn—Zn—O semiconductor (such as In2O3-SnO2-ZnO), In—Ga—Sn—O semiconductor may be used.

(22) In each of the embodiments, the semiconductor film of each TFT included in the liquid crystal panel includes oxide semiconductor. The semiconductor film may include amorphous silicon or polycrystalline silicon. For example, continuous grain silicon (CG silicon)) may be preferably used as the polycrystalline silicon.

(23) In each of the embodiments, the color filter includes color portions of three colors including red, green, and blue. However, the present invention may include a color filter including color portions of four colors including red, green, blue, and yellow.

(24) Other than the embodiment (23), the present invention may include a color filter including color portions of red, green, and blue and a colorless portion that mostly passes whole visible light and has no wavelength selectivity.

(25) In each of the embodiments, the backlight device included in the liquid crystal display device is an edge light type. However, a backlight device of a direct type may be used.

(26) In each of the embodiments, the liquid crystal display device of a transmission type including a backlight device as an external light source is described. However, a reflection type liquid crystal display device that displays images using outside light may be included in the scope of the present invention and such a reflection type liquid crystal display device may not include a backlight device.

(27) In each of the embodiments, the TFTs are used as switching components of the liquid crystal display device. However, liquid crystal display devices that include switching components other than TFTs (e.g., thin film diodes (TFDs)) may be included in the scope of the present invention. Furthermore, black-and-white liquid crystal display devices, other than color liquid crystal display device, are also included in the scope of the present invention.

(28) In each of the embodiments, the liquid crystal panel including a liquid crystal panel that is classified as a small sized or a small to middle sized panel is used. Such a liquid crystal panel is used in electronic devices including portable terminal devices, mobile phones (including smart phones), notebook computers (including tablet type notebook computers), digital photo frames, portable video games, and electronic ink papers. However, a liquid crystal display device including a liquid crystal panel that is classified as a middle sized or a large sized (extra-large sized) panel may be included in the scope of the present invention. Such a liquid crystal pane has a screen size of 20 to 90 inches and is used in a television device, electronic devices including digital signage, and electronic blackboard.

EXPLANATION OF SYMBOLS 11, 211: liquid crystal panel (display device), 11a: CF board (opposed display component), 11b, 211b, 311b, 1211b: array board (display component), 11c: liquid crystal layer (liquid crystals), 11e, 111e, 511e, 611e: array board side alignment film (alignment film), 11j, 311j: sealing member, 17: TFT (display element), 28, 128, 228, 328, 526, 628, 728, 828, 928, 1028, 1228: film forming area restricting portion, 29, 129, 229, 329, 429, 529, 629, 729, 829, 929, 1029: alignment film material storing portion, 33, 933, 1033: corner portion, 36: semiconductor film, 39, 639, 739: first interlayer insulation film (insulation film, inorganic insulation film), 40, 140, 540, 640, 740, 840: organic insulation film (insulation film), 41: second interlayer insulation film (insulation film, inorganic insulation film), 42, 1142, 1242: film forming area restricting portion, 43: alignment film material storing portion, 211a, 1111a, 1211a: CF board (display component), 211b, 1211b: array board (opposed display component), 211d: CF board side alignment film (alignment film), 211k 1111k, 1211k: OC layer (insulation film), AA: display area, FP: thick portion, GS: glass substrate (substrate), NAA: non-display area, θ: angle, θ2: minimum angle, θ3: minimum angle

The invention claimed is:
1. A display component comprising:
a substrate including a display area and a non-display area surrounding the display area;
an insulation film disposed on the substrate over a range of the display area and the non-display area;
an alignment film disposed on a surface of the insulation film over a range of the display area and the non-display area;
a film forming area restricting portion disposed in the non-display area and recessed in a part of the surface of the insulation film and having a side surface; and
an alignment film material storing portion disposed closer to the display area than the film forming area restricting portion in the non-display area and recessed in a part of the insulation film and having a side surface, wherein
an angle formed by at least a part of the surface of the alignment film material storing portion and a normal line of a plate surface of the substrate is greater than an angle formed by the side surface of the film forming area restricting portion and the normal line.
2. The display component according to claim 1, wherein the alignment film material storing portion has a width greater than that of the film forming area restricting portion.
3. The display component according to claim 1, wherein the insulation film has a multilayered structure including an inorganic insulation film having a relatively small thickness and an organic insulation film having a relatively great thickness, and
the alignment film material storing portion is recessed at least in the organic insulation film.
4. The display component according to claim 1, wherein the alignment film material storing portion is disposed to surround an entire periphery of the display area.
5. The display component according to claim 1, wherein a minimum value of the angle formed by the at least a part of the side surface of the alignment film material storing portion and the normal line is greater than an angle formed by a portion of the side surface of the film forming area restricting portion holding a material for the alignment film and the normal line.

6. The display component according to claim 5, wherein the minimum value of the angle formed by the at least a part of the side surface of the alignment film material storing portion and the normal line is from 60 degrees to 80 degrees.

7. The display component according to claim 6, wherein the minimum value of the angle formed by the at least a part of the side surface of the alignment film material storing portion and the normal line is from 70 degrees to 80 degrees.

8. The display component according to claim 1, wherein a minimum value of the angle formed by the side surface of the film forming area restricting portion and the normal line is smaller than a minimum value of the angle formed by the at least a part of the side surface of the alignment film material storing portion and the normal line.

9. The display component according to claim 8, wherein the minimum value of the angle formed by the side surface of the film forming area restricting portion and the normal line is 50 degrees or smaller.

10. The display component according to claim 1, a minimum value of the angle formed by an entire area of the side surface of the alignment film material storing portion and the normal line is greater than an angle formed by a portion of the side surface of the film forming area restricting portion holding a material for the alignment film and the normal line.

11. The display component according to claim 1, wherein
the alignment film material storing portion has a plan view shape including a corner portion, the plan view shape is seen in a direction along the normal line, and
a minimum value of an angle formed by a side surface of the corner portion and the normal line is greater than an angle formed by a portion of the side surface of the film forming area restricting portion holding a material for the alignment film and the normal line.

12. A display device comprising:
the display component according to claim 1;
an opposed display component attached to the display component with a distance therebetween to be opposed to the display component;
liquid crystals sandwiched between the display component and the opposed display component; and
a sealing member surrounding the liquid crystals and disposed between the display component and the opposed display component to enclose the liquid crystals, wherein
the film forming area restricting portion is disposed closer to the display area than the sealing member and surrounds an entire periphery of the display area.

13. The display device according to claim 12, further comprising:
a display element disposed on the display component or the opposed display component to face the liquid crystals; and
a semiconductor film included in the display element and formed of oxide semiconductor.

14. The display device according to claim 13, wherein the oxide semiconductor includes indium (In), gallium (Ga), zinc (Zn), and oxide (O).

15. A display component comprising:
a substrate including a display area and a non-display area surrounding the display area;
an insulation film disposed on the substrate over a range of the display area and the non-display area;
an alignment film disposed on a surface of the insulation film over a range of the display area and the non-display area;
a film forming area restricting portion disposed in the non-display area and projecting from the surface of the insulation film; and
an alignment film material storing portion disposed closer to the display area than the film forming area restricting portion in the non-display area and recessed in a part of the insulation film.

16. A display device comprising:
the display component according to claim 15;
an opposed display component attached to the display component with a distance therebetween to be opposed to the display component;
liquid crystals sandwiched between the display component and the opposed display component; and
a sealing member surrounding the liquid crystals and disposed between the display component and the opposed display component to enclose the liquid crystals, wherein
the film forming area restricting portion is disposed closer to the display area than the sealing member and surrounds an entire periphery of the display area.

17. The display device according to claim 16, further comprising:
a display element disposed on the display component or the opposed display component to face the liquid crystals; and
a semiconductor film included in the display element and formed of oxide semiconductor.

18. The display device according to claim 17, wherein the oxide semiconductor includes indium (In), gallium (Ga), zinc (Zn), and oxide (O).

* * * * *